US012038707B2

(12) United States Patent
Sasoh

(10) Patent No.: US 12,038,707 B2
(45) Date of Patent: Jul. 16, 2024

(54) IMAGE FORMING DEVICE

(71) Applicant: SHARP KABUSHIKI KAISHA, Sakai (JP)

(72) Inventor: Kiyoshi Sasoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/975,580

(22) Filed: Oct. 27, 2022

(65) Prior Publication Data

US 2023/0176513 A1 Jun. 8, 2023

(30) Foreign Application Priority Data

Dec. 7, 2021 (JP) ................................ 2021-198668

(51) Int. Cl.

*G03G 15/23* (2006.01)
*G03G 15/00* (2006.01)
*G03G 15/20* (2006.01)

(52) U.S. Cl.

CPC ....... *G03G 15/234* (2013.01); *G03G 15/2064* (2013.01); *G03G 15/6552* (2013.01); *G03G 2215/1685* (2013.01); *G03G 2215/2083* (2013.01)

(58) Field of Classification Search

CPC ............. G03G 15/234; G03G 15/2064; G03G 15/6552; G03G 2215/1685; G03G 2215/2083

See application file for complete search history.

(56) References Cited

U.S. PATENT DOCUMENTS

| | | | | | |
|---|---|---|---|---|---|
| 7,942,416 | B2 * | 5/2011 | Muratani | G03G 15/6579 | 271/301 |
| 2008/0224386 | A1 * | 9/2008 | Kunieda | B65H 9/008 | 271/226 |
| 2009/0067908 | A1 * | 3/2009 | Muratani | G03G 15/6579 | 399/401 |
| 2011/0069998 | A1 * | 3/2011 | Ozaki | G03G 15/0935 | 399/269 |
| 2012/0026562 | A1 * | 2/2012 | Yoshimoto | G03G 15/605 | 358/498 |
| 2012/0155943 | A1 * | 6/2012 | Taki | G03G 15/234 | 399/401 |

(Continued)

FOREIGN PATENT DOCUMENTS

JP 2019003124 A 1/2019

*Primary Examiner* — David H Banh
(74) *Attorney, Agent, or Firm* — ScienBiziP, P.C.

(57) ABSTRACT

This image forming device includes an image former, a fuser, a sheet transport path that transports a paper sheet to the image former and the fuser, first and second discharge ports that are connected to the sheet transport path so as to enable a paper sheet on which a toner image has been fused to be discharged to the outside, and a controller. The sheet transport path includes first to third transport paths, and a first and second switcher. The controller, in the case of duplex printing, controls the first and second switchers such that a one end side of the paper sheet is transported to the second discharge port, and controls the second switcher such that, when the one end side is being discharged from the second discharge port, reverses the paper sheet and causes the another end side to be transported toward the image former.

9 Claims, 18 Drawing Sheets

(56) References Cited

U.S. PATENT DOCUMENTS

| | | | | |
|---|---|---|---|---|
| 2014/0185118 | A1* | 7/2014 | Hudson | G02B 26/123 359/204.1 |
| 2014/0186063 | A1* | 7/2014 | Hogan | G03G 15/55 399/35 |
| 2014/0320873 | A1* | 10/2014 | Kato | H04N 1/00578 358/1.12 |
| 2015/0123343 | A1* | 5/2015 | Sei | B65H 29/58 271/290 |
| 2015/0212466 | A1* | 7/2015 | Fukunaga | G03G 15/2028 399/328 |
| 2016/0154361 | A1* | 6/2016 | Osaki | G03G 21/1695 399/90 |
| 2016/0176677 | A1* | 6/2016 | Mizuguchi | B65H 29/14 271/225 |
| 2017/0129732 | A1* | 5/2017 | Onishi | B65H 29/12 |
| 2017/0195507 | A1* | 7/2017 | Kainuma | H04N 1/00551 |
| 2017/0213630 | A1* | 7/2017 | Maruyama | B65H 29/60 |
| 2018/0035001 | A1* | 2/2018 | Murase | H04N 1/1903 |
| 2018/0334351 | A1* | 11/2018 | Fujita | G06F 3/1203 |
| 2019/0058801 | A1* | 2/2019 | Imamura | G06F 3/1205 |
| 2021/0127025 | A1* | 4/2021 | Horiguchi | H04N 1/00737 |

* cited by examiner

IMAGE FORMING DEVICE

BACKGROUND OF THE INVENTION

Field of the Invention

The present disclosure relates to an image forming device. More specifically, the present disclosure relates to an image forming device which is suitable for duplex printing of a long paper sheet.

Description of the Background Art

As a conventional image forming device, known is an image forming device that includes a sheet feeding transport path and a reverse transport path inside a main body of the device. The device is configured such that, at the time of duplex printing of a paper sheet, a paper sheet on which a toner image has been formed on one side is sent to the reverse transport path, and the paper sheet is transported from the reverse transport path to an image former (secondary transferer) via the sheet feeding transport path such that a toner image is formed on another side on which a toner image has not been formed. More specifically, the reverse transport path includes a first return transport path connecting the downstream side of a fuser in the sheet feeding transport path and the upstream side of the image former in the sheet feeding transport path, and a second return transport path that connects a midway position of the first return transport path and the upstream side of the image former in the sheet feeding transport path. At the time of duplex printing, after sending and stopping in the first return transport path a transport direction one end side of a paper sheet on which a toner image is formed on one side, a toner image is formed on the another side by transporting the transport direction another end side of the paper sheet from the second return transport path to the image former via the sheet feeding transport path.

In the conventional image forming device, which adopts a configuration that performs duplex printing by reversing the paper sheet inside the main body of the device, when the paper sheet is long and the length is sufficiently longer than the reverse transport path, the another end side of the paper sheet collides with the paper sheet itself while being reversed such that it is no longer able to be advanced. Therefore, a limitation in the length of the paper sheet is required. Note that duplex printing of long paper sheets as described above is performed, for example, to create bellows-fold printed materials such as pamphlets and menus, horizontal or vertical POP advertisements, and the like.

The present disclosure has been made in consideration of the circumstances described above. An object of the present disclosure is to provide an image forming device that is capable of eliminating a limitation in the length of a paper sheet at the time of duplex printing.

SUMMARY OF THE INVENTION

The present disclosure provides an image forming device including: an image former that forms a toner image on a paper sheet; a fuser that fuses a toner image formed on a paper sheet; a sheet transport path that transports a paper sheet to the image former and the fuser; a first discharge port and a second discharge port that are connected to the sheet transport path so as to enable a paper sheet on which a toner image has been fused to be discharged to the outside; and a controller, where the sheet transport path includes a first transport path that transports a paper sheet to the image former and the fuser, and transports a paper sheet on which a toner image has been fused to the first discharge port, a second transport path that connects a transport direction downstream side of the fuser in the first transport path to the second discharge port, a third transport path that connects a transport direction upstream side of the second discharge port in the second transport path to a transport direction upstream side of the image former in the first transport path, a first switcher provided in a portion of the second transport path that is connected with the first transport path, and a second switcher provided in a portion of the third transport path that is connected with the second transport path, and the controller, in the case of duplex printing, controls a switching operation of the first switcher such that a one end side of a paper sheet on which a toner image has been fused on one side is transported to the second discharge port, and controls a switching operation of the second switcher such that, when the one end side is being discharged from the second discharge port to the outside, reverses a paper sheet and causes another end side, being the opposite side to the one end, to be transported toward the image former via the third transport path and the first transport path.

According to the image forming device of the present disclosure, at the time of duplex printing of a paper sheet, upon discharging a transport direction one end side of the paper sheet on which a toner image has been formed on one side through the second transport path and to the outside from the second discharge port, and temporarily discharging a large portion of the paper sheet from the second discharge port to the outside, it is possible to form a toner image on another side on which a toner image has not been formed by sending the transport direction another end side of the paper sheet to the first transport path via the third transport path, and then sending the paper sheet to the image former and the fuser. A large portion of the paper sheet can be temporarily discharged to the outside during such a reversal of the paper sheet. Therefore, duplex printing is possible even in a case of a long paper sheet in which the paper sheet has a length that exceeds the total length of the transport path. This allows limitations in the sheet length to be eliminated.

DESCRIPTION OF THE PREFERRED EMBODIMENTS

Hereinafter, the present disclosure will be described in more detail with reference to the drawings. Note that the description below is illustrative in all respects, and should not be construed as limiting the present disclosure.

First Embodiment

Figure 1:
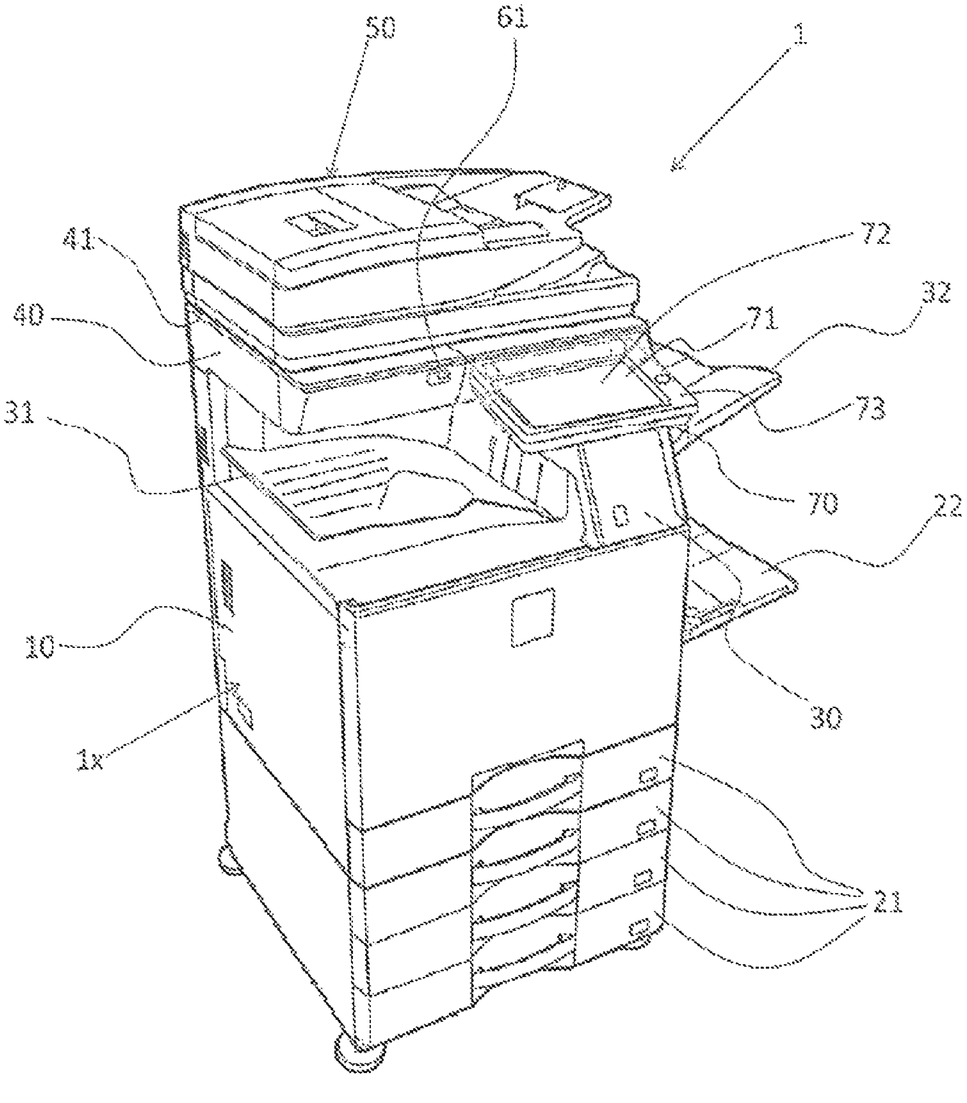
FIG. 1 is a perspective view of an image forming device of a first embodiment of the present disclosure.
Figure 2:
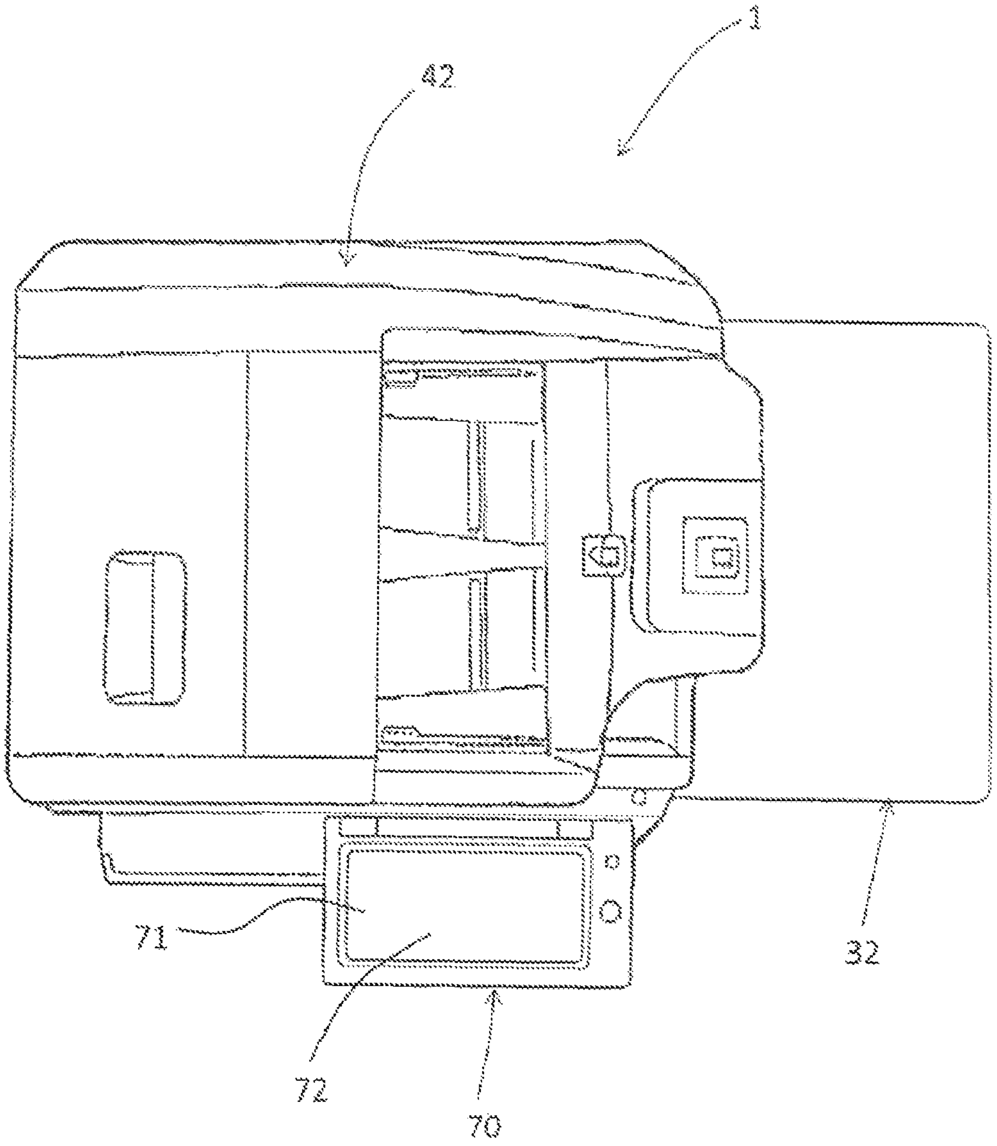
FIG. 2 is a plan view of the image forming device of the first embodiment.
Figure 3:
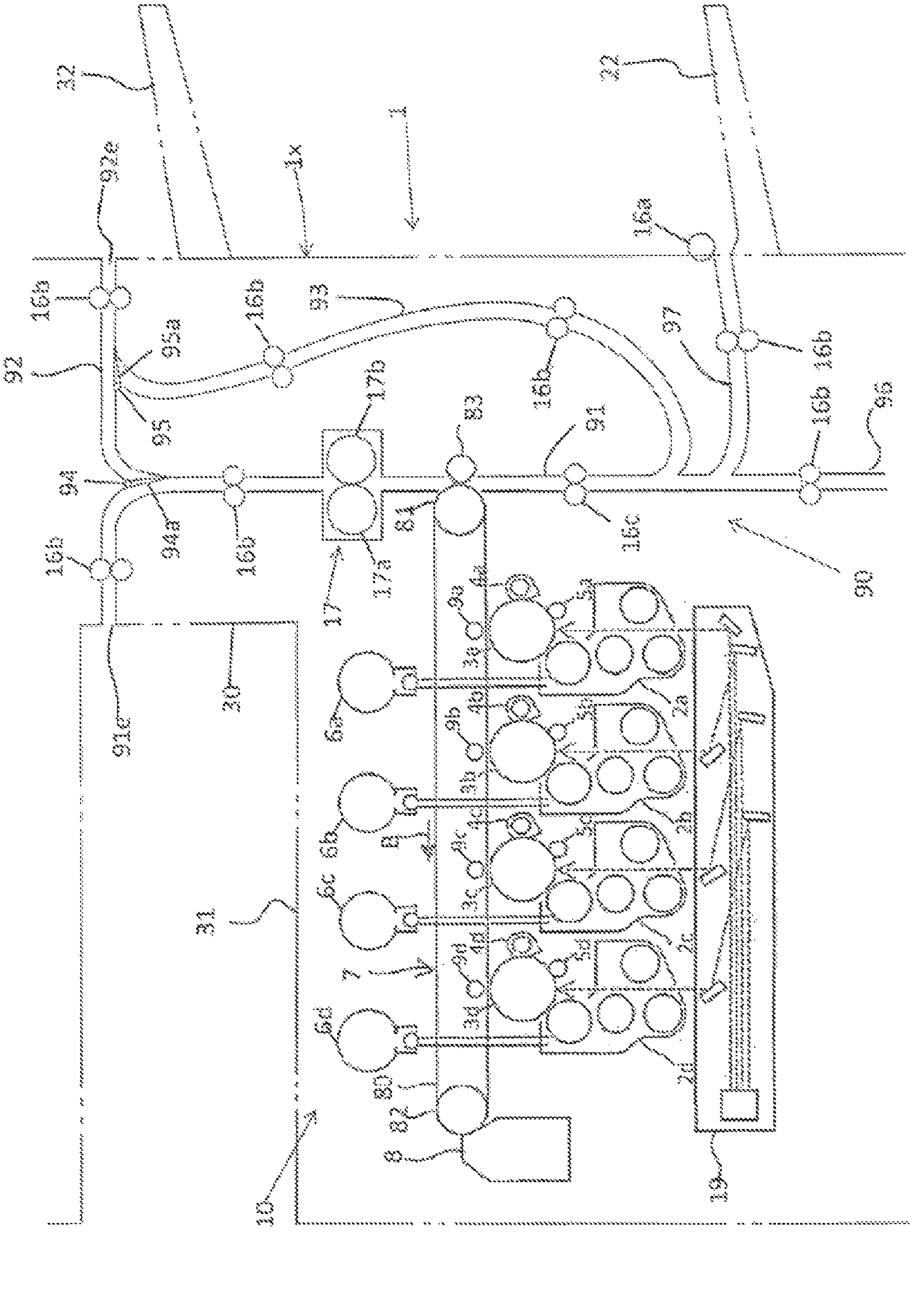
FIG. 3 is a schematic diagram illustrating the internal structure of the image forming device of the first embodiment.

FIG. 1 is a perspective view of an image forming device of a first embodiment of the present disclosure. FIG. 2 is a plan view of the image forming device of the first embodiment. FIG. 3 is a schematic diagram illustrating the internal structure of the image forming device of the first embodiment.

As shown in FIG. 1, the image forming device (multifunction peripheral) 1 includes a housing 1*x* having a printing unit 10 serving as an image former, and an operation unit 70 provided in an upper part of the housing 1*x*. Furthermore, the image forming device 1 includes a controller, a communication interface circuit, an image processing circuit and the like (not shown) inside the housing 1*x*. The controller includes an operation recognizer, a display controller, a job controller, and a memory.

An image forming device (hereinafter also referred to as a multifunction peripheral (MFP)) 1 is a device that processes image data, and examples include electronic equipment having a duplication (copying) function, a printing function, a document reading (scanning) function, a document editing function, a document transmission (fax) function, a communication function, and the like.

In the housing 1*x*, a storage space is provided below the printing unit 10 that accommodates a paper feed tray 21 as a plurality of vertical levels that can be pulled out. A first discharge port tray 31 (hereunder, sometimes referred to as "first paper discharge tray 31") is provided above the printing unit 10 as a paper discharger. A scanner unit 40 is provided above the first paper discharge tray 31. A USB connection terminal 61 is provided on the left side of the operation unit 70 on the front surface of an upper part of the housing 1*x* (the front surface of the scanner unit 40). Furthermore, in the housing 1*x*, the upper right side of the printing unit 10 is a discharger 30 that discharges printed paper sheets to the first paper discharge tray 31 or a second discharge port tray 32 (hereunder, sometimes referred to as "second paper discharge tray 32").

The first paper discharge tray 31 is disposed on the left side and the second paper discharge tray 32 is disposed on the right side of the discharger 30. Moreover, a first discharge port 91*e* of a sheet transport path 90 described later (see FIG. 3) is provided on an inner surface on the discharger 30 on the first paper discharge tray 31 side. A second discharge port 92*e* of the sheet transport path 90 is provided on an outside surface of the discharger 30 on the second paper discharge tray 32 side.

In the image forming device 1, a manual feed tray 22 is provided on a right surface of the printing unit 10 of the housing 1*x*. The second paper discharge tray 32 is provided above a manual feed tray 22 on the right surface of the housing 1*x*. An automatic document feeder (also referred to as ADF) 50 is joined to a rear upper edge of an image inputter (scanner unit) 40 of the housing 1*x* via a hinge.

The operation unit 70 includes a display (display unit) 71 that displays an operation screen, an operator (touch panel unit) 72 provided on the display 71 so as to receive operations from the user that are made with respect to the operation screen on the display 71, and a support frame 73 that supports the periphery of the display 71 and the operator 72. The display 71 is a part that displays information, and displays the information required for executing the various functions, results of execution of the functions, and the like to the user. For example, an LCD, an organic EL display, or the like is used, and when a touch panel is used as the operator 72, the display 71 and the touch panel are provided in a superimposed manner.

For example, the display 71 uses characters, symbols, graphics, images, icons, animations, moving images, and the like, to display information required to set setting items used by the image forming device when printing and the like, execute a document reading function and the like, and display an operation screen of a selected function or a function suggestion screen.

The operator 72 is an input device for the user of the image forming device to perform predetermined input operations. For example, the operator 72 is a part for inputting information, such as characters, and inputting a function selection, and may be a keyboard, a mouse, a touch panel, and the like. The keys operated by the user include an item selection key, an operation start key, a function selection key, and a setting key.

The upper surface of the image inputter 40 is a document stage 41 on which a document to be read is placed. The document on the document stage 41 can be held in place by the automatic document feeder 50. Furthermore, it is assumed a function is provided that detects that a document has been placed on the document stage 41 (document presence detection function).

In addition, it is preferable that a function is provided that detects the size of the document that has been placed on the document stage 41 (document size detection function). However, a function that detects the size of the document that has been placed on the document stage 41 does not have to be provided. If a function that detects the size of the document is not provided, it is assumed that a function is provided so that the user inputs the size of the document that has been placed on the document stage 41.

The automatic document feeder 50 may be a device that reads just one side of a document, or a device that reads both sides of a document. Furthermore, it is assumed that the automatic document feeder 50 is provided with a function that detects the document size when a document consisting of a plurality of sheets is placed thereon.

It is assumed that a function is provided that detects that printing paper has been placed in the manual feed tray 22 (paper presence detection function). In addition, it is assumed that a function is provided that detects the size of the printing paper that has been placed in the manual feed tray 22 (paper size detection function).

As shown in FIG. 3, the printing unit (image former) 10 accommodates four photoreceptor drums 3*a*, 3*b*, 3*c* and 3*d*, four chargers (charging devices) 5*a*, 5*b*, 5*c* and 5*d* that charge the surface of each photoreceptor drum 3*a* to 3*d*, an exposure unit (exposure device) 19 that forms an electrostatic latent image on the surface of each photoreceptor drum 3*a* to 3*d*, four developing devices 2*a*, 2*b*, 2*c* and 2*d* that individually accommodate black, cyan, magenta and yellow toner and develop the electrostatic latent image on the surface of each photoreceptor drum 3*a* to 3*d* to form a toner image, four cleaner units 4*a*, 4*b*, 4*c* and 4*d* that remove the residual toner that remains on the surface of each photoreceptor drum 3*a* to 3*d* following development and image transfer, four toner cartridges (toner supplying devices) 6*a*, 6*b*, 6*c* and 6*d* that individually supply the four toner colors to each of the developing devices 2*a* to 2*d*, an intermediate transfer belt unit (transfer device) 7 that transfers the toner image on the surface of each photoreceptor drum 3*a* to 3*d* onto a recording medium, an intermediate transfer belt cleaning unit 8, and the like.

Here, of the reference signs a to d, a represents the members for forming a black image, b represents the members for forming a cyan image, c represents the members for forming a magenta image, and d represents the members for forming a yellow image.

In the image forming device 1, a black toner image, a cyan toner image, a magenta toner image, and a yellow toner image are selectively formed on the surface of each photoreceptor drum 3*a* to 3*d* based on image data for each of the four color components of black (K), cyan (C), magenta (M), and yellow (Y). Then, each of the toner images that have been formed are superimposed on the intermediate transfer belt unit 7, and form a single color image on a paper sheet serving as the recording medium.

Because the photoreceptor drums 3*a* and 3*d* corresponding to each color have the same configuration, these are collectively described below using reference sign 3. Furthermore, in the same manner, the developing devices are collectively described using reference sign 2, the chargers are collectively described using reference sign 5, the cleaner units are collectively described using reference sign 4, and the toner cartridges are collectively described using reference sign 6.

The photoreceptor drum 3 is configured by a conductive substrate and a photoreceptive layer formed on the surface thereof, and is a cylindrical member responsible for latent image formation through charging and exposure. The photoreceptor drum 3 exhibits conductivity under light irradiation, and forms an electrical image referred to as an electrostatic latent image on the surface thereof. Furthermore, the photoreceptor drum 3 is supported by a drive means (not shown) such that it is capable of being rotationally driven about an axis.

The four developing devices 2 for forming the respective images of each different color are disposed below the photoreceptor drums 3.

The cleaner unit 4 removes the residual toner on the surface of the photoreceptor drum 3 after the development and the image transfer steps.

The charger 5 uniformly charges the surface of the photoreceptor drum 3 to a predetermined potential. In addition to the contact roller-type charger 5 shown in FIG. 1, contact brush-type and non-contact charger-type chargers can also be used.

The developing device 2 mainly includes a developer tank that accommodates a developer (two-component developer) that contains a toner and a magnetic carrier, a developing roller that supplies the developer to the photoreceptor drum 3, and a toner transfer mechanism.

The developing device 2 is provided with a developing roller that is disposed so as to face the photoreceptor drum 3 inside the developer tank, and is a device that develops (visualizes) the electrostatic latent image formed on the surface of the photoreceptor drum 3 by supplying the toner to the surface of the photoreceptor drum 3 with the developing roller.

The carrier contained in the developer used in the present embodiment is a magnetic carrier having magnetic properties. For example, a ferrite carrier can be used.

The exposure unit 19 forms an electrostatic latent image corresponding to the image data on the surface of the charged photoreceptor drum 3 by irradiating and exposing the surface of the photoreceptor drum 3 with light corresponding to the image data from below the charger 5 and the developing device 2.

In the present embodiment, when light corresponding to the image data is emitted from the exposure unit 19, it passes through a light guide path provided inside the developing device 2 and irradiates the surface of the rotating photoreceptor drum 3.

In the present embodiment, the exposure unit 19 is, as shown in FIG. 3, a laser scanning unit (LSU) provided with a laser irradiator and a reflecting mirror. However, EL (electroluminescent) or LED write heads with an array of light-emitting elements can also be used.

The exposure unit 19 is disposed below the developing device 2.

Furthermore, in the present embodiment, in order to reduce the size of the image forming device 1 without reducing the size of the developing device 2 itself, the light emitted from the exposure unit 19 (illustrated by a dotted line) passes through the light guide path provided inside the developing device 2, and irradiates the surface of the photoreceptor drum 3. The light guide path is a space that penetrates through the interior of developing device 2.

The light path of the light emitted from the exposure unit 19 is provided inside the developing device 2. Therefore, it is possible to arrange the four developing devices 2 closer to each other, which contributes to a reduction in size of the image forming device 1.

The intermediate transfer belt unit 7 includes intermediate transfer rollers 9 (9*a*, 9*b*, 9*c* and 9*d*), an intermediate transfer belt 80, an intermediate transfer belt drive roller 81, an intermediate transfer belt driven roller 82, and an intermediate transfer belt tension mechanism (not shown).

The intermediate transfer rollers 9, the intermediate transfer belt drive roller 81, the intermediate transfer belt driven roller 82, and the intermediate transfer belt tension mechanism stretch the intermediate transfer belt 80, and rotationally drive the intermediate transfer belt 80 in the direction of arrow B in FIG. 3.

The intermediate transfer rollers 9 are rotatably supported by an intermediate transfer roller mounter of the intermediate transfer belt tension mechanism of the intermediate transfer belt unit 7. A transfer bias is applied to the intermediate transfer rollers 9 so that the toner image of the photoreceptor drum 3 is transferred onto the intermediate transfer belt 80.

The intermediate transfer belt 80 is provided so as to make contact with each photoreceptor drum 3. A color toner image (multicolor toner image) is formed on the intermediate transfer belt 80 as a result of the toner images of each color component formed on the photoreceptor drums 3 being successively superimposed and transferred. The intermediate transfer belt 80 is formed with an unterminated shape using a film having a thickness of, for example, about 100 μm to 150 μm.

The drive roller 81 and the driven roller 82 are disposed further outside the photoreceptor drums (3*a* and 3*d*) that are disposed at both ends of the four photoreceptor drums 3 in the forward direction of the intermediate transfer belt 80. Furthermore, as shown in FIG. 3, the intermediate transfer belt cleaning unit 8 is disposed so as to make contact with a portion of the intermediate transfer belt unit 7 on the driven roller 82 side.

Also, the transfer roller 83 is disposed in close proximity beside the drive roller 81. The paper sheet that has been transported passes between the transfer roller 83 and the drive roller 81.

The transfer of the toner image from the photoreceptor drum 3 to the intermediate transfer belt 80 is performed by the intermediate transfer rollers 9, which make contact with the rear side of the intermediate transfer belt 80. A high-voltage transfer bias (a high voltage having the opposite polarity (+) to the charge polarity of the toner (−)) for transferring the toner image is applied to the intermediate transfer rollers 9.

The intermediate transfer rollers 9 are formed based on a metal (e.g. stainless steel) shaft with a diameter such as 8 to 10 mm, and the surface is covered with a conductive elastic material (such as EPDM or urethane foam). The conductive elastic material makes it possible for the intermediate transfer roller 9 to uniformly apply the high voltage to the intermediate transfer belt 80. In the present embodiment, roller shape components (intermediate transfer roller 9) are used as the transfer electrode. However, it is possible to use a different component such as a brush.

As described above, the electrostatic latent image on each photoreceptor drum 3 is visualized by a toner corresponding to each color component to form the respective toner images, and the toner images are superimposed and stacked on the intermediate transfer belt 80. In this manner, as a result of the rotation of the intermediate transfer belt 80, the stacked toner images move to a contact position (transferer) between the paper sheet that has been transported and the intermediate transfer belt 80, and are transferred onto the paper sheet due to the transfer roller 83 disposed at this position. In this case, the intermediate transfer belt 80 and the transfer roller 83 are pressed against each other at a predetermined nip. Also, a voltage is applied to the transfer roller 83 in order to transfer the toner images to the paper sheet. The voltage is a high voltage with the opposite polarity (+) to the charge polarity of the toner (−).

In order to constantly obtain the nip mentioned above, either the transfer roller 83 or the intermediate transfer belt drive roller 81 is made of a hard material such as metal, and the other is made of a soft material such as an elastic roller (an elastic rubber roller, a resin foam roller, or the like). The toner that becomes adhered to the intermediate transfer belt 80 due to contact between the intermediate transfer belt 80 and the photoreceptor drums 3, and the residual toner on the intermediate transfer belt 80 that was not transferred from the intermediate transfer belt 80 to the paper sheet at the time of transfer of the toner images causes mixing of the toner colors in the subsequent step, and is removed by the intermediate transfer belt cleaning unit 8.

The intermediate transfer belt cleaning unit 8 is provided with a cleaning blade (cleaning member) that makes contact with the intermediate transfer belt 80. The portion of the intermediate transfer belt 80 making contact with the cleaning blade is supported from the rear side by the intermediate transfer belt driven roller 82.

Further, the printing unit 10 includes the paper feed tray 21, which accommodates a plurality of recording media disposed at the very bottom, the manual feed tray 22 disposed on one side surface, on which non-standard size paper is set, the sheet transport path 90 for transporting a paper sheet from the paper feed tray 21 or the manual feed tray 22 to the intermediate transfer belt unit 7, and the like. Note that it is possible to set standard size paper on the manual feed tray 22.

As shown in FIG. 3, the sheet transport path 90 guides paper sheets from the paper feed tray 21 and the manual feed tray 22 to the first paper discharge tray 31 or the second paper discharge tray 32 via the transferer and the fuser 17. Here, the transferer is located between the intermediate transfer belt drive roller 81 and the transfer roller 83. In addition, a pickup roller 16*a*, a plurality of pairs of transport rollers 16*b*, a registration roller 16*c*, the transferer (transfer roller 83), the fuser 17, and the like, are disposed on the sheet transport path 90.

The sheet transport path 90 includes: a first transport path 91 that transports a paper sheet to the printing unit (image former) 10 and the fuser 17, and transports a paper sheet on which a toner image has been fused to the first discharge port 91*e*; a second transport path 92 path that connects a transport direction downstream side of the fuser 17 in the first transport path 91 to the second discharge port 92*e*; a third transport path 93 that connects a transport direction upstream side of the second discharge port 92*e* in the second transport path 92 to a transport direction upstream side of the transferer (transfer roller 83) of the printing unit 10 in the first transport path 91; a first switcher 94 provided in the portion of the second transport path 92 that is connected with the first transport path 91; and a second switcher 95 provided in the portion of the third transport path 93 that is connected with the second transport path 92. The first transport path 91 is divided into a portion that is on the upstream side of the transferer (transfer roller 83), a section between the transferer and the fuser 17, and a portion downstream of the fuser 17.

Furthermore, the sheet transport path 90 includes a standard size sheet transport path 96 that connects the plurality of paper feed trays 21 and the upstream side section of the first transport path 91, and a non-standard size sheet transport path 97 that connects the manual feed tray 22 and the upstream section of the first transport path 91.

The first switcher 94 is provided with a pivotable first switching plate 94*a* that switches the transport direction such that the first transport path 91 and the first discharge port 91*e* communicate with each other, or the first transport path 91 and the second transport path 92 communicate with each other. The first switching plate 94*a* pivots due to a first actuator (not shown) that is driven and controlled by the controller.

The second switcher 95 is provided with a pivotable second switching plate 95*a* that switches the transport direction such that the first transport path 91 and the second discharge port 92*e* communicate with each other, or the second discharge port 92*e* and the third transport path 93 communicate with each other. The second switching plate 95*a* pivots due to a second actuator (not shown) that is driven and controlled by the controller.

The transport rollers 16*b* are small rollers for promoting and assisting the transport of a sheet, and a plurality of pairs are provided along the sheet transport path 90.

The pickup roller 16*a* is provided on the end of the paper feed tray 21 (see FIG. 1) and the manual feed tray 22, and is an introduction roller that supplies paper sheets (recording media) from the paper feed tray 21 or the manual feed tray 22 one at a time to the sheet transport path 90.

The registration roller 16*c* temporarily holds a paper sheet being transported on the sheet transport path 90, and transports the sheet to the transferer with a timing that allows the leading end of the toner image on the intermediate transfer belt 80 to coincide with the leading end of the sheet.

As shown in FIG. 3, the fuser 17 includes a heat roller 17*a* and a pressure roller 17*b* that sandwich a paper sheet on which the toner image has been transferred, and rotate in opposite directions to each other. The heat roller 17*a* is controlled by a controller (not shown) to achieve a predetermined fusing temperature. The controller controls the temperature of the heat roller 17*a* based on a detection signal from a temperature detector (not shown).

After the temperature has been raised to the fusing temperature, the heat roller 17*a* and the pressure roller 17*b* press against the paper sheet to melt the toner, and fuse the toner image to one side of the paper sheet. After the toner image is fused, the paper sheet is transported by the transport roller 16*b* to the first discharge port 91*e* of the sheet transport path 90 then and discharged onto the first paper discharge tray 31, or transported to the second discharge port 92*e* and then discharged onto the second paper discharge tray 32.

When the paper sheet is discharged onto the first paper discharge tray 31, the first switcher 94 opens a portion on the downstream side of the first transport path 91 (doses the connection with the second transport path 92) such that communicates with the first discharge port 91*e*. When the paper sheet is discharged onto the second paper discharge tray 32, the first switcher 94 opens the connection with the second transport path 92, and the second switcher 95 also closes the connection with the third transport path 93 such that the second transport path 92 communicates with the second discharge port 92*e*.

Operation During Duplex Printing of Paper Sheet

According to the image forming device 1 configured as described above, it is possible to perform duplex printing of a paper sheet as follows. At this time, the image forming device 1 is capable of performing duplex printing without a length limitation when the paper sheet has a long length (long paper sheet).

FIG. 4 to 7 are first to fourth explanatory operation diagrams illustrating duplex printing by the image forming device of the first embodiment. Note that, in the following description, a case where duplex printing is performed with respect a long paper sheet S serving as the paper sheet will be illustrated. However, the duplex printing operation of the image forming device 1 is generally the same when standard size paper is used.

As shown in FIG. 1 to 4, in the of case duplex printing of a long paper sheet S (or standard size paper), the controller controls the switching operation of the first switcher 94 such that a one end s1 side of the long paper sheet S, on which a toner image has been fused on one side, is transported to the second discharge port 92*e*. Further, the controller controls the switching operation of the second switcher 95 such that, when the one end s1 side is being discharged from the second discharge port 92*e* to the outside, the long paper sheet S is reversed and another end s2 side on the opposite side to the one end s1 is transported toward the printing unit 10 via the third transport path 93 and the first transport path 91.

To explain the duplex printing procedure in detail, as shown in FIG. 1 to 4, the long paper sheet S firstly is set on the manual feed tray 22. At this time, it is desirable to set the one end of the long paper sheet S at the position of the pickup roller 16*a* and prevent the another end side of the long paper sheet S from hanging down onto the floor. For example, the long paper sheet S is placed on a stand installed on the right side of the image forming device 1. In the case of the present embodiment, the length of the long paper sheet S is longer than the sum of the length of the first transport path 91, the length of the second transport path 92, and the length of the third transport path 93.

Next, the user operates the operator 72 of the operation unit 70 and sets a long paper sheet duplex printing mode. Alternatively, the long paper sheet duplex printing mode is set with respect to a PC (personal computer) connected to the image forming device 1 via a LAN. As a result, in the sheet transport path 90, the first switcher 94 and the second switcher 95 operate the first switching plate 94*a* and the second switching plate 95*a* such that the second transport path 92 communicates with the first transport path 91.

Next, the user inputs the image data to be subjected to duplex printing on the long paper sheet S by connecting a USB memory to the USB connection terminal 61 of the image forming device 1 and inputting data to the storage of the image forming device 1. Alternatively, the data is accepted by a selection made with respect to print data saved in the storage of the image forming device 1, or is input to the storage of the image forming device 1 using a PC. Furthermore, the print data may be read from both sides of a long document using the reader of the automatic document feeder 50. Moreover, the size of the long paper sheet S to be used is input, the images to be printed on the one side and the another side of the long paper sheet S are selected, and the print area and the like of the long paper sheet S is input. After the preparation for duplex printing is completed in this manner, a start operation of the duplex printing is performed using the operator 72 or a PC. Consequently, as shown in FIG. 4, the one end s1 side of the long paper sheet S on the manual feed tray 22 is sent from the non-standard size sheet transport path 97 to the first transport path 91 by the pickup roller 16*a* and the transport rollers 16*b*, and a toner image is formed on the one side as a result of the long paper sheet S passing by the transferer (transfer roller 83) and the fuser 17.

When the start operation of the duplex printing of the long paper sheet S is performed, before starting the printing operation of the long paper sheet S, the controller may display on the display 71 query content that asks the user whether or not the surrounding environment allows use of the second paper discharge tray 32. According to this configuration, for example, it is possible to prompt the user in advance to check that there is no object that may obstruct the movement of the one end s1 side of the long paper sheet S is discharged onto the second paper discharge tray 32 and hangs down. In this case, for example, printing is started by pressing a "print" key displayed on the display 71.

Figure 4:
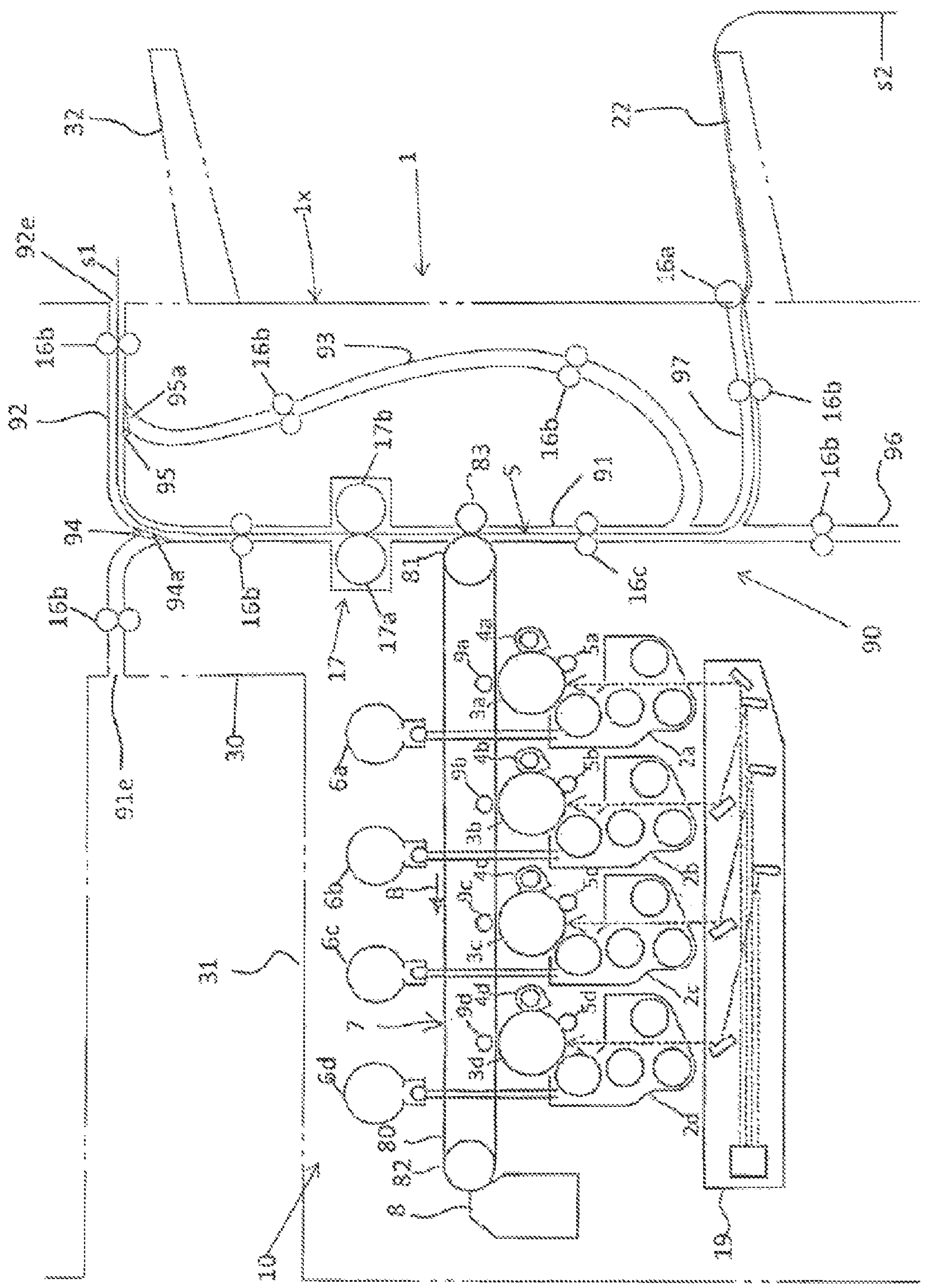
FIG. 4 is a first explanatory operation diagram illustrating duplex printing by the image forming device of the first embodiment.
Figure 5:
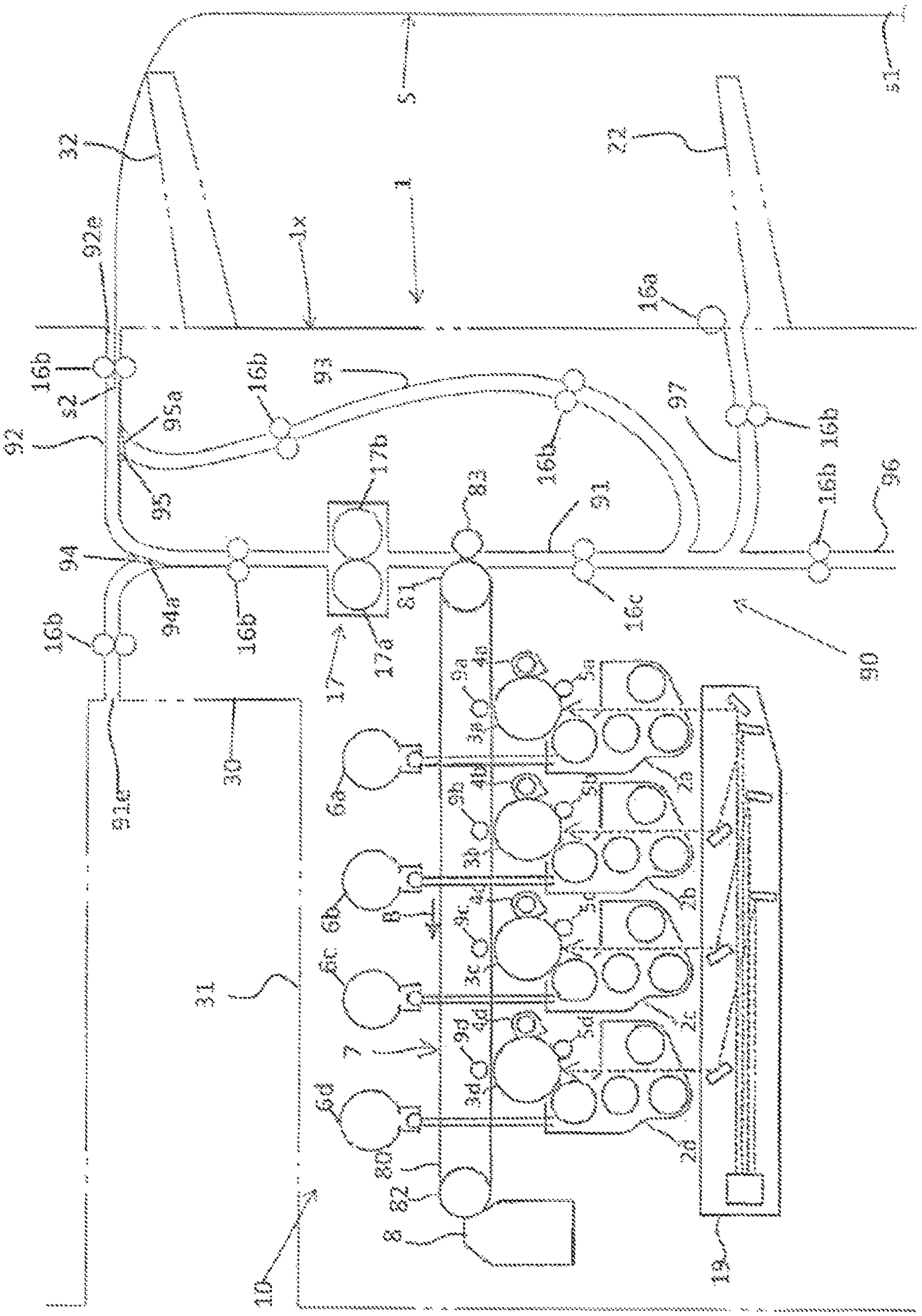
FIG. 5 is a second explanatory operation diagram illustrating duplex printing by the image forming device of the first embodiment.

Then, as shown in FIG. 4, the one end s1 side of the long paper sheet S proceeds along the second transport path 92 and reaches the second discharge port 92*e*. As shown in FIG. 5, the one end s1 side slides on the second paper discharge tray 32 and hangs downward. Then, the transport rollers (paper discharge rollers) 16*b* stop once the another end s2 of the long paper sheet S passes the second switcher 95 and arrives in front of the transport roller (paper discharge roller) 16*b* near the second discharge port 92*e*. At this time, the one end s1 and the another end s2 of the long paper sheet S are detected by a sensor provided at a predetermined location of the sheet transport path 90, and the controller stops the transport rollers (paper discharge rollers) 16*b* at the timing the another end s2 approaches the transport rollers (paper discharge rollers) 16*b*. For example, this can be achieved as follows.

The sensor provided at a predetermined location of the sheet transport path 90 may be used to calculate the length of the long paper sheet by detecting the passage of the one end s1 and the another end s2 of the long paper sheet. Alternatively, the passage of the another end s2 of the long paper sheet may simply be detected, and the controller may stop the transport rollers (paper discharge rollers) 16*b* at the timing the another end s2 approaches the transport rollers (paper discharge rollers) 16*b* based on the transport speed along the transport path. Alternatively, the trailing end of the another end s2 may be detected by providing a sensor in front of the transport rollers (paper discharge rollers) 16*b*, and the controller may stop the transport rollers (paper discharge rollers) 16*b* at the timing the another end s2 approaches the transport rollers (paper discharge rollers) 16*b*.

Figure 6:
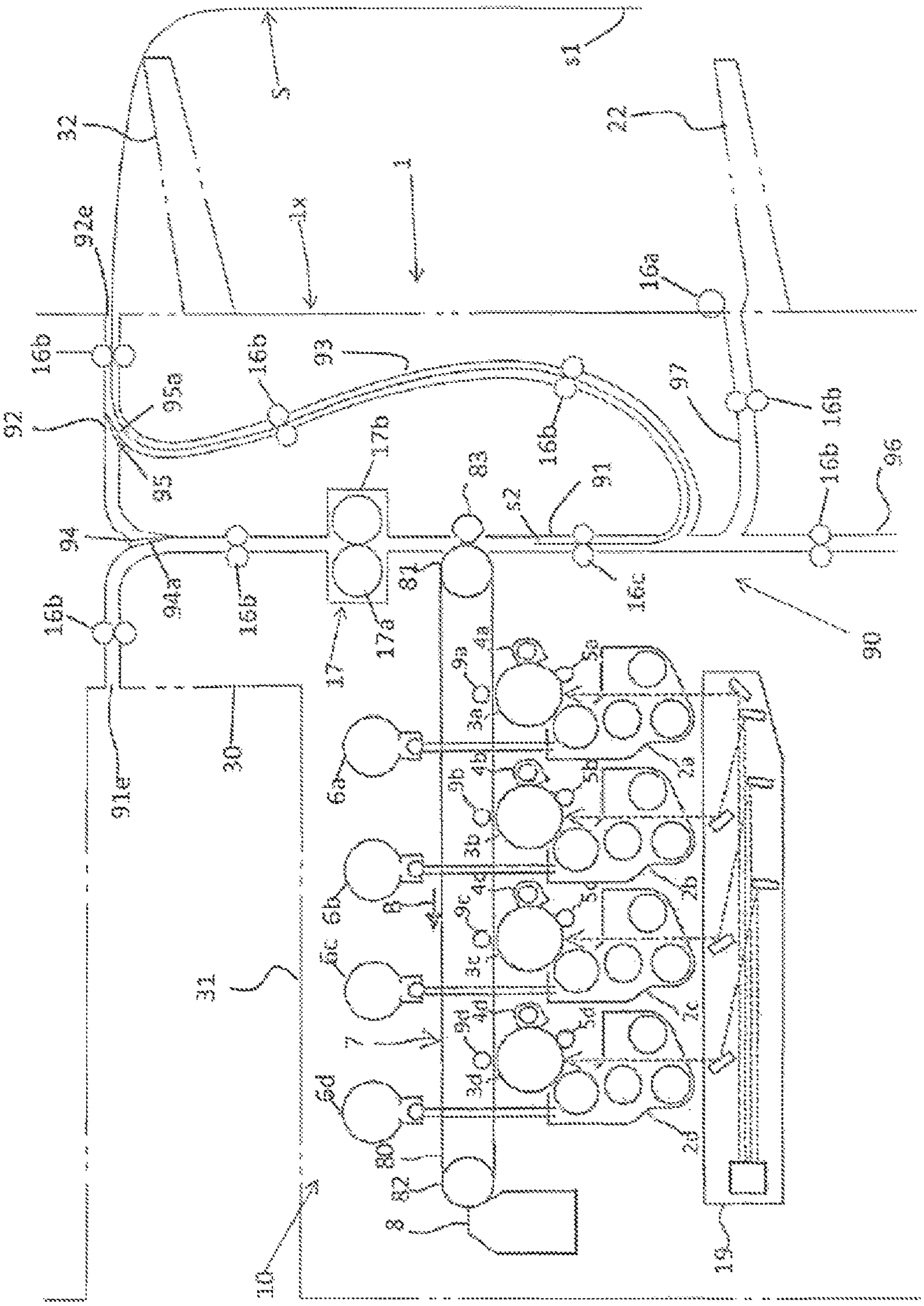
FIG. 6 is a third explanatory operation diagram illustrating duplex printing by the image forming device of the first embodiment.
Figure 7:
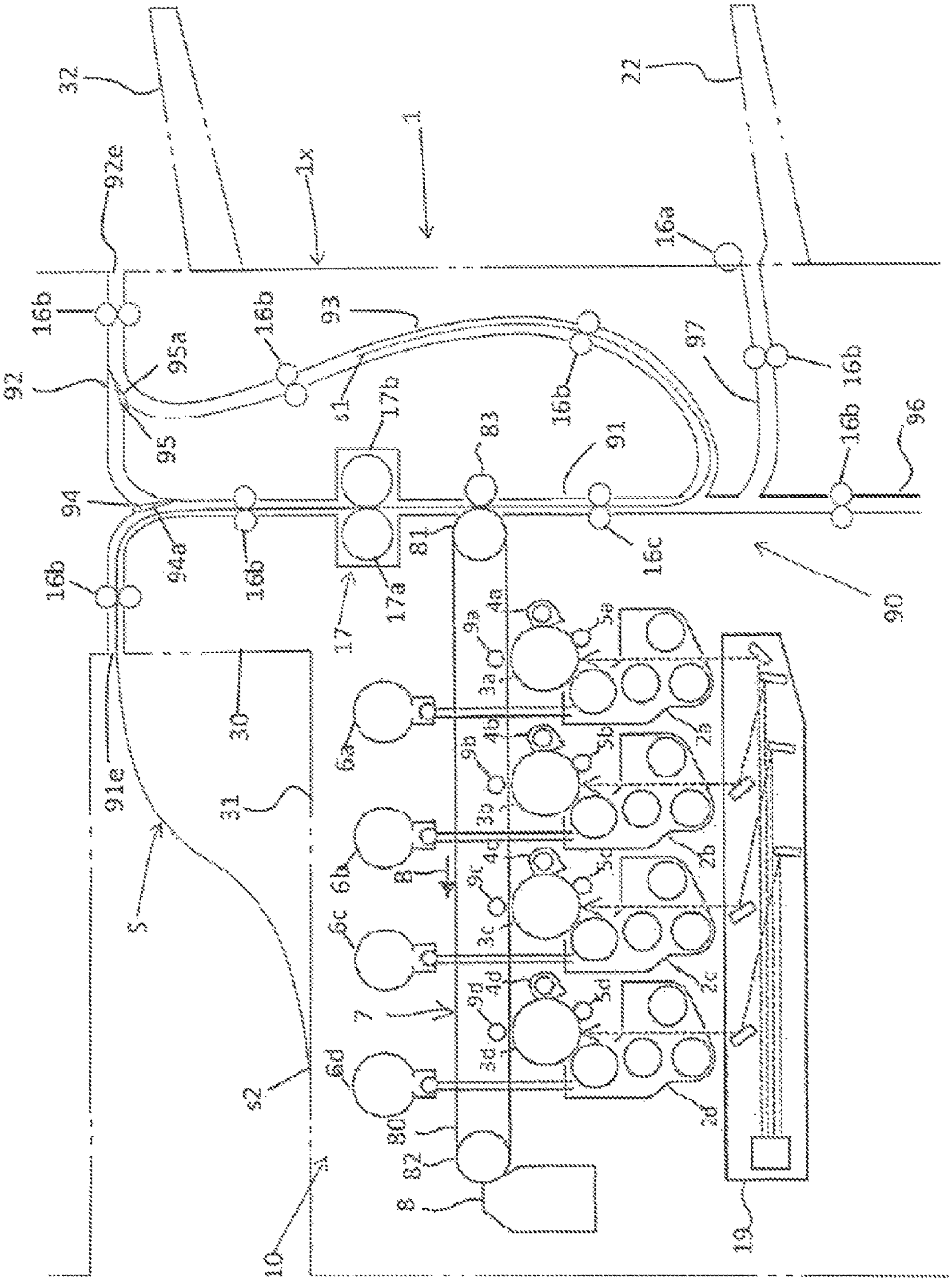
FIG. 7 is a fourth explanatory operation diagram illustrating duplex printing by the image forming device of the first embodiment.

Then, as shown in FIG. 6, the controller pivots the second switching plate 95*a* of the second switcher 95 such that the second discharge port 92*e* and the third transport path 93 communicate with each other, and also pivots the first switching plate 94*a* of the first switcher 94 such that the first discharge port 91*e* and the first transport path 91 communicate with each other. In addition, the transport rollers (paper discharge rollers) 16*b* are rotated in reverse to transport the another end s2 side of the long paper sheet S to the third transport path 93. Then, as shown in FIG. 7, the another end s2 side enters the first transport path 91, and a toner image is formed on the another side of the long paper sheet S as a result of the long paper sheet S passing by the transferer (transfer roller 83) and the fuser 17. Then, the long paper sheet S on which a toner image has been formed on both sides is ejected from the first discharge port 91*e* onto the first paper discharge tray 31. At this time, the another end s2 side of the long paper sheet S is made to slide on the first paper discharge tray 31 so that the another end s2 side does not stay on the first paper discharge tray 31, and the another end s2 side of the long paper sheet S is accommodated inside a cardboard box installed on the left side of the image forming device 1 as necessary.

As described above, the image forming device 1 of the first embodiment differs from the conventional technique in that the one end s1 side of the long paper sheet S with one printed side is temporarily discharged to the outside. Furthermore, the one end s1 side is temporarily discharged to the outside from the second discharge port 92*e*, which is separate from the first discharge port 91*e* through which the long paper sheet S is finally discharged. Also, after the one end s1 side is temporarily discharged to the outside, the one end s1 side of the long paper sheet S passes through a route that does not hinder the another end s2 side from proceeding while the another end s2 side of the long paper sheet S is being transported to the first discharge port 91*e*. Therefore, duplex printing can be performed without limitations in the sheet length of the long paper sheet S.

First Modification of First Embodiment

Figure 8:
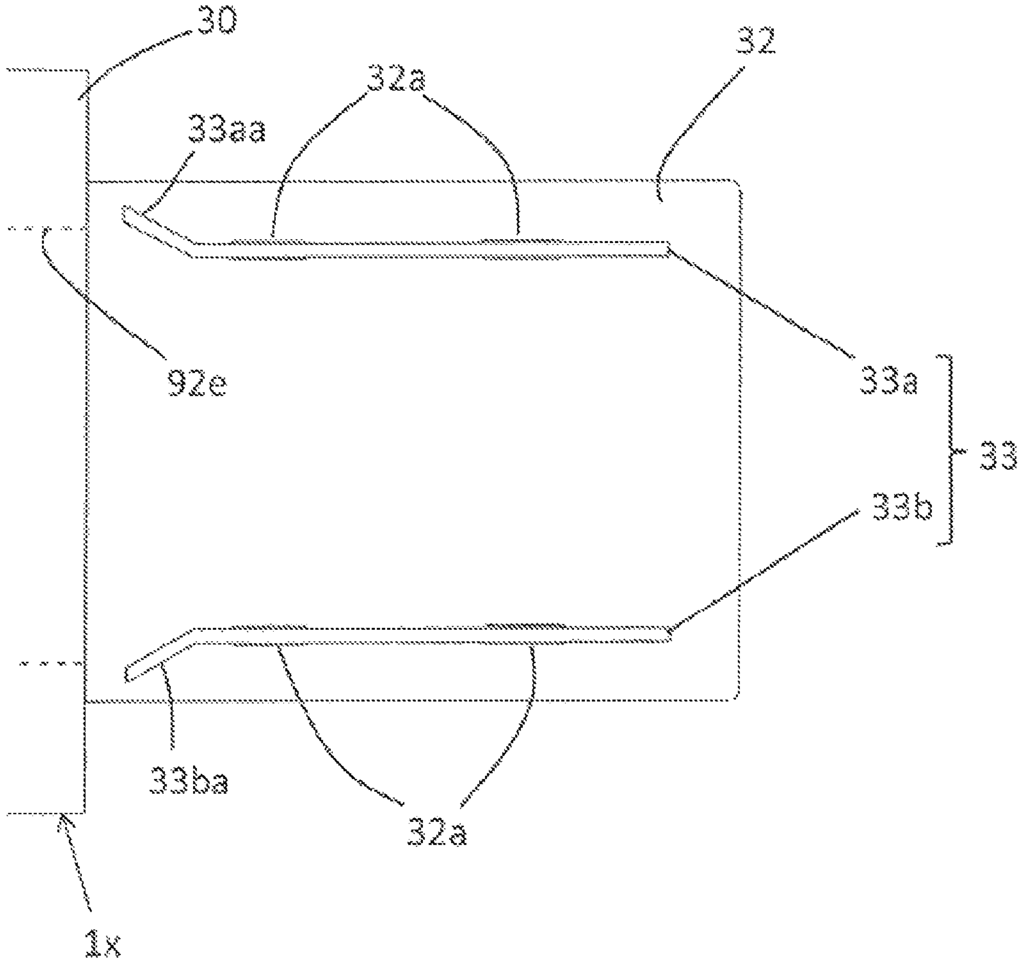
FIG. 8 is a plan view showing a first modification of the second discharge port tray in the image forming device of the first embodiment.

FIG. 8 is a plan view showing a first modification of the paper discharge tray in the image forming device of the first embodiment. Note that, in FIG. 8, the same components as those in FIG. 1 to 7 are denoted by the same reference signs. As shown in FIG. 8, in the first embodiment described above, a guide mechanism 33 that guides a long paper sheet may be provided on the second paper discharge tray 32, which is provided on the outside surface of the discharger 30 of the housing 1*x* and receives a paper sheet that has been discharged from the second discharge port 92*e*.

In the case of the first modification, the guide mechanism 33 consists of a parallel pair of guide plates 33*a* and 33*b*. The second paper discharge tray 32 is provided with four mounting holes 32*a* for the pair of guide plates 33*a* and 33*b*. The pair of guide plates 33*a* and 33*b* are in sliding contact with the pair of long sides of the long paper sheet S (see FIGS. 5 and 6) and guide the long paper sheet S in a straight line, and the lower ends are provided with two protrusions (not shown) that are fitted into two of the mounting holes 32*a*.

Furthermore, the second discharge port 92*e* side ends of the pair of guide plates 33*a* and 33*b* form bent portions 33*aa* and 33*ba* that are bent in a direction away from each other toward the second discharge port 92*e*. The pair of bent portions 33*aa* and 33*ba* enable the one end s1 of the long paper sheet S that has been discharged from the second discharge port 92*e* to enter between the pair of guide plates 33*a* and 33*b* more smoothly.

As a result of providing the guide mechanism 33 on the second paper discharge tray 32, the one end s1 side of the long paper sheet S is temporarily discharged from the second discharge port 92*e* to the outside, and a tilt in the long paper sheet S can be corrected when it is reversed and returned to the second discharge port 92*e*.

Second Modification of First Embodiment

Figure 9A:
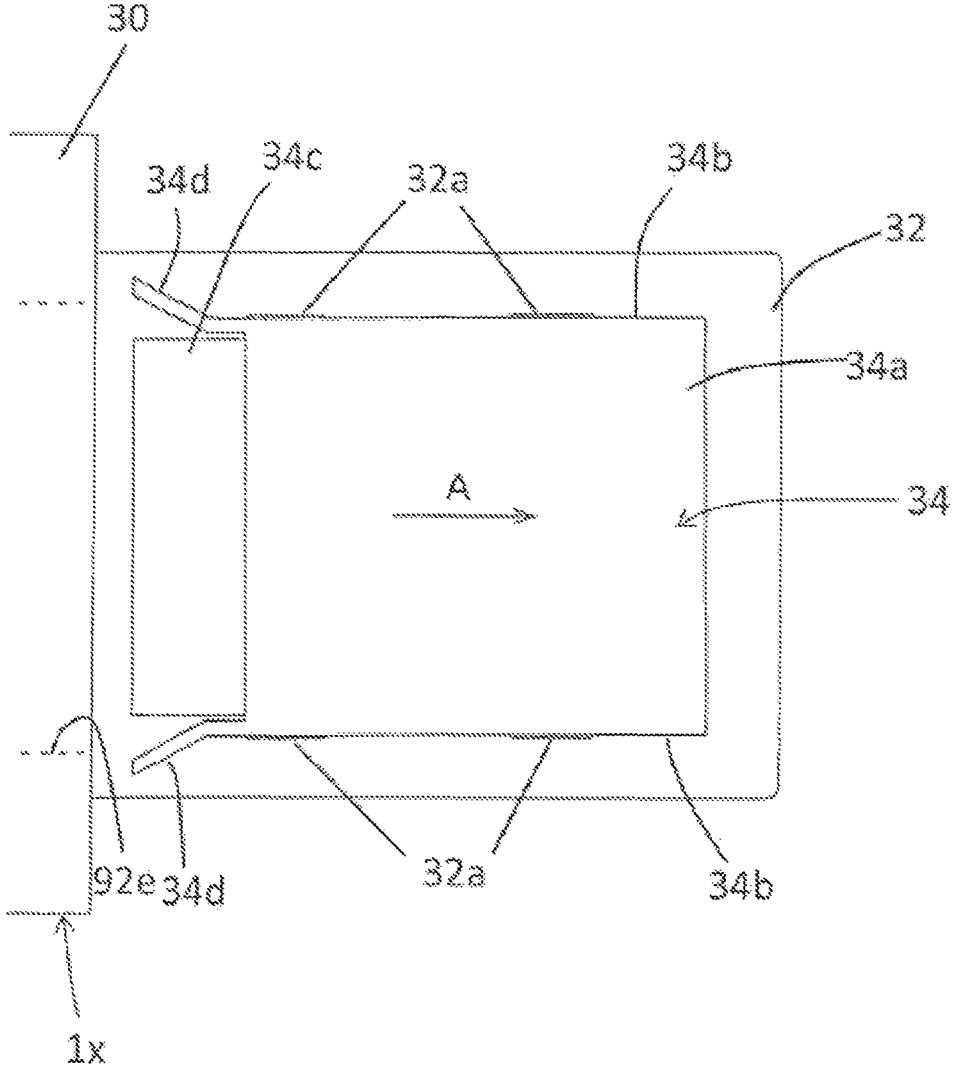
FIG. 9A is a plan view showing a second modification of the second discharge port tray in the image forming device of the first embodiment.
Figure 9B:
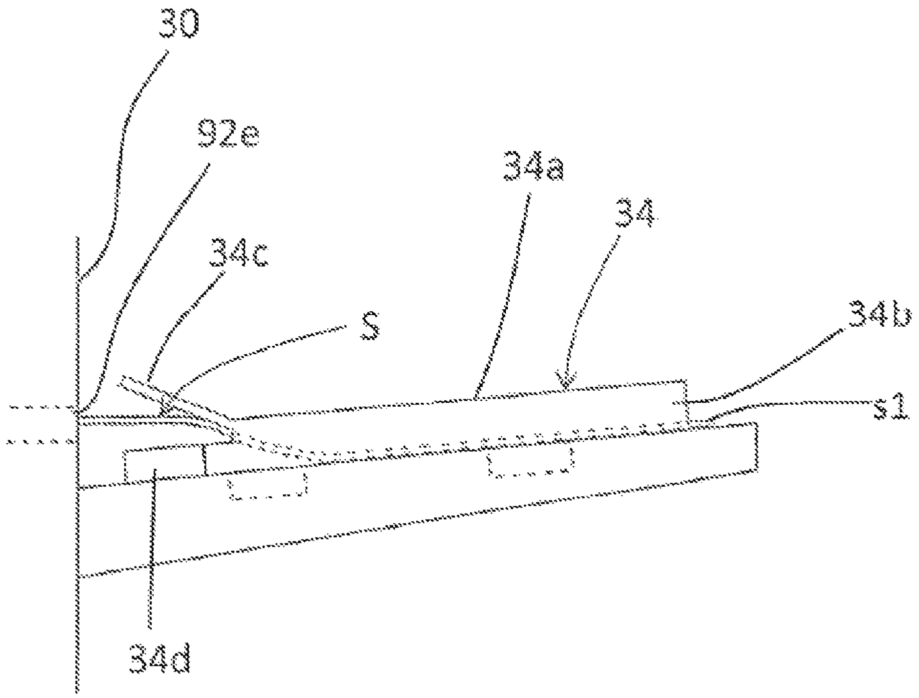
FIG. 9B is a front view of the second discharge port tray shown in FIG. 9A.

FIG. 9A is a plan view showing a second modification of the paper discharge tray in the image forming device of the first embodiment. FIG. 9B is a front view of the paper discharge tray shown in FIG. 9A. Note that, in FIGS. 9A and 9B, the same components as those in FIG. 1 to 7 are denoted by the same reference signs.

As shown in FIG. 9A and FIG. 9B, in the first embodiment described above, a guide mechanism 34 that differs to that of the first modification may be provided on the second paper discharge tray 32 provided on the outside surface of the discharger 30 of the housing 1*x*.

In the case of the second modification, the guide mechanism 34 includes a top panel 34*a*, a pair of side panels 34*b* provided along the edges of the top panel 34*a* that are in an orthogonal direction to the paper sheet transport direction (arrow A direction), an inclined panel 34*c* provided on the end of the top panel 34*a* on the second discharge port 92*e* side, and bent portions 34*d* that are each provided on the ends of the pair of side panels 34*b* on the second discharge port 92*e* side. Note that two protrusions (not shown) that are fitted into the four mounting holes 32*a* of the second paper discharge tray 32 are provided at the lower ends of each of the pair of side panels 34*b*.

The inclined panel 34*c* and the pair of bent portions 34*d* are bent in a direction away from each other toward the second discharge port 92*e*. As a result, the one end s1 of the long paper sheet S that has been discharged from the second discharge port 92*e* can enter the flat guide slit formed by the second paper discharge tray 32 and the guide mechanism 34 more smoothly. Furthermore, by providing the guide mechanism 34 on the second paper discharge tray 32, the one end s1 side of the long paper sheet S is temporarily discharged from the second discharge port 92*e* to the outside, and a tilt in the long paper sheet S can be corrected when it is reversed and returned to the second discharge port 92*e*. In addition, the one end s1 of the long paper sheet S that has been discharged from the second discharge port 92*e* can be prevented from traveling upward.

Third and Fourth Modifications of First Embodiment

Figure 10:
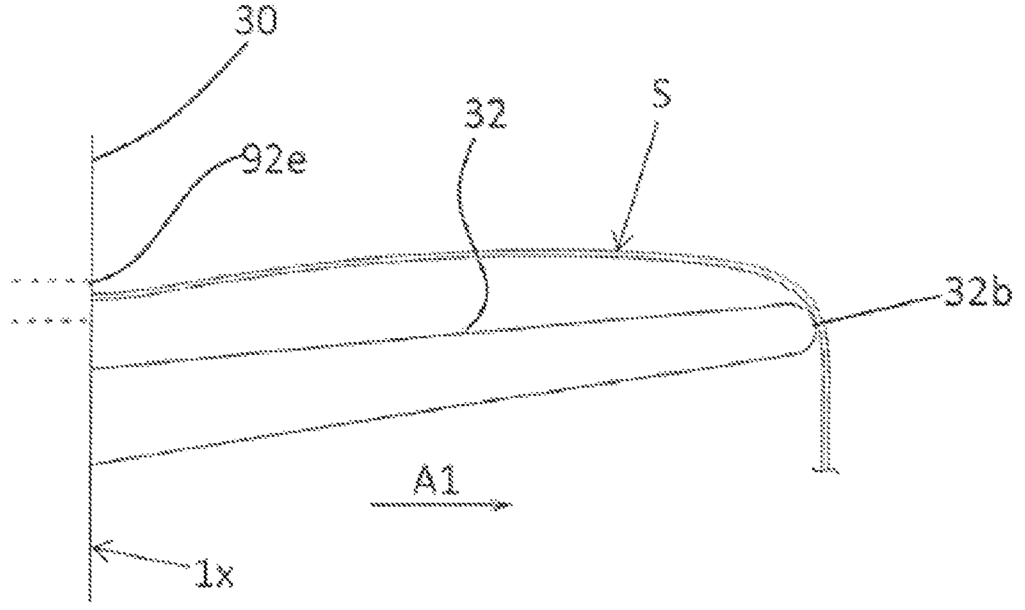
FIG. 10 is a front view showing a third modification of the second discharge port tray in the image forming device of the first embodiment.
Figure 11:
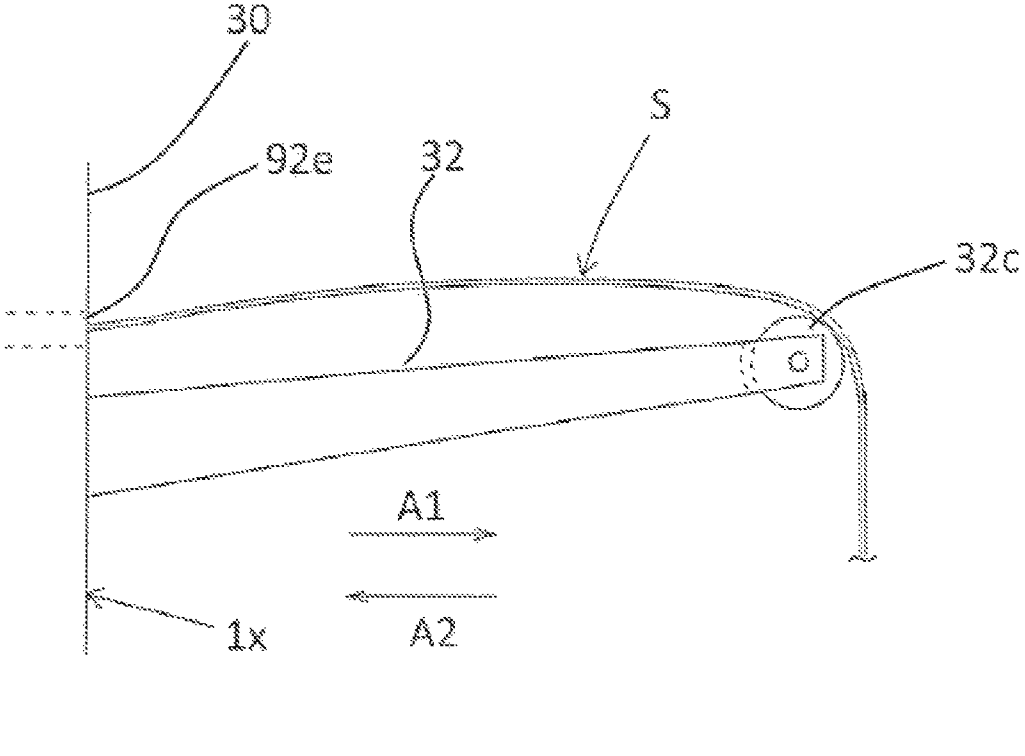
FIG. 11 is a front view showing a fourth modification of the second discharge port tray in the image forming device of the first embodiment.

FIG. 10 is a front view showing a third modification of the paper discharge tray in the image forming device of the first embodiment. FIG. 11 is a front view showing a fourth modification of the paper discharge tray in the image forming device of the first embodiment. Note that, in FIGS. 10 and 11, the same components as those in FIG. 1 to 7 are denoted by the same reference signs.

As shown in the third modification in FIG. 10, in the first embodiment described above, a curved surface 32*b* may be provided on the paper sheet transport direction end (arrow A1 direction) of the second paper discharge tray 32 provided on the outer surface of the discharger 30 of the housing 1*x*. Alternatively, as shown in the fourth modification in FIG. 11, in the first embodiment described above, a roller 32*c* may be rotatably provided on the paper sheet transport direction end (arrow A1 direction) of the second paper discharge tray 32. Additionally, in this case, the roller 32*c* may be rotated forward and backward by a motor (not shown) according to the arrow A1 direction that discharges the long paper sheet S, or the arrow A2 direction that causes the long paper sheet S to travel in reverse. According to the third and fourth modifications, the unprinted another side of the long paper sheet S with one printed side can move smoothly along the curved surface 32*b* or the roller 32*c*.

Fifth Modification of First Embodiment

Figure 12:
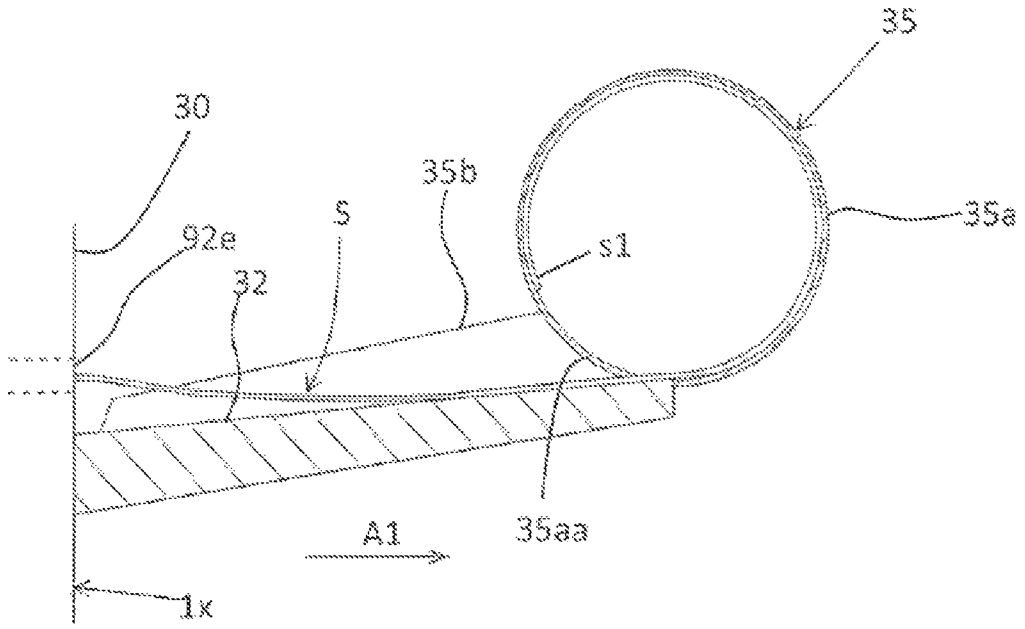
FIG. 12 is a front view showing a fifth modification of the second discharge port tray in the image forming device of the first embodiment.

FIG. 12 is a front view showing a fifth modification of the paper discharge tray in the image forming device of the first embodiment. Note that, in FIG. 12, the same components as those in FIG. 1 to 7 are denoted by the same reference signs.

As shown in the fifth modification in FIG. 12, in the first embodiment described above, a storage cylinder 35 capable of temporarily accommodating the long paper sheet S from the one end s1 side may be provided on the paper sheet transport direction end (arrow A1 direction) of the second paper discharge tray 32.

The storage cylinder 35 includes a cylinder 35*a*, and a pair of arms 35*b* provided in both axial direction ends of the cylinder 35*a*. Furthermore, the lower ends of the pair of arms 35*b* are provided with a plurality of protrusions (not shown) that are fitted into the plurality of mounting holes 32*a* provided in the second paper discharge tray 32 (see FIG. 8). Moreover, an opening 35*aa* is provided at a portion of the cylinder 35*a* facing the upper surface of the second paper discharge tray 32.

According to the fifth modification, it is possible to accommodate the one end s1 side of the long paper sheet S, which is temporarily and partially discharged from the second discharge port 92*e* during duplex printing, while being received in the second paper discharge tray 32 and while being taken up by the storage cylinder 35. This eliminates the need for a tray, a box, or other receiving container placed on the floor to receive the one end s1 side of the discharged long paper sheet S. Furthermore, the pair of arms 35*b* of the storage cylinder 35 also function as a guide member that guides the long paper sheet S to the opening 35*aa* of the cylinder 35*a*.

Second Embodiment

Figure 13:
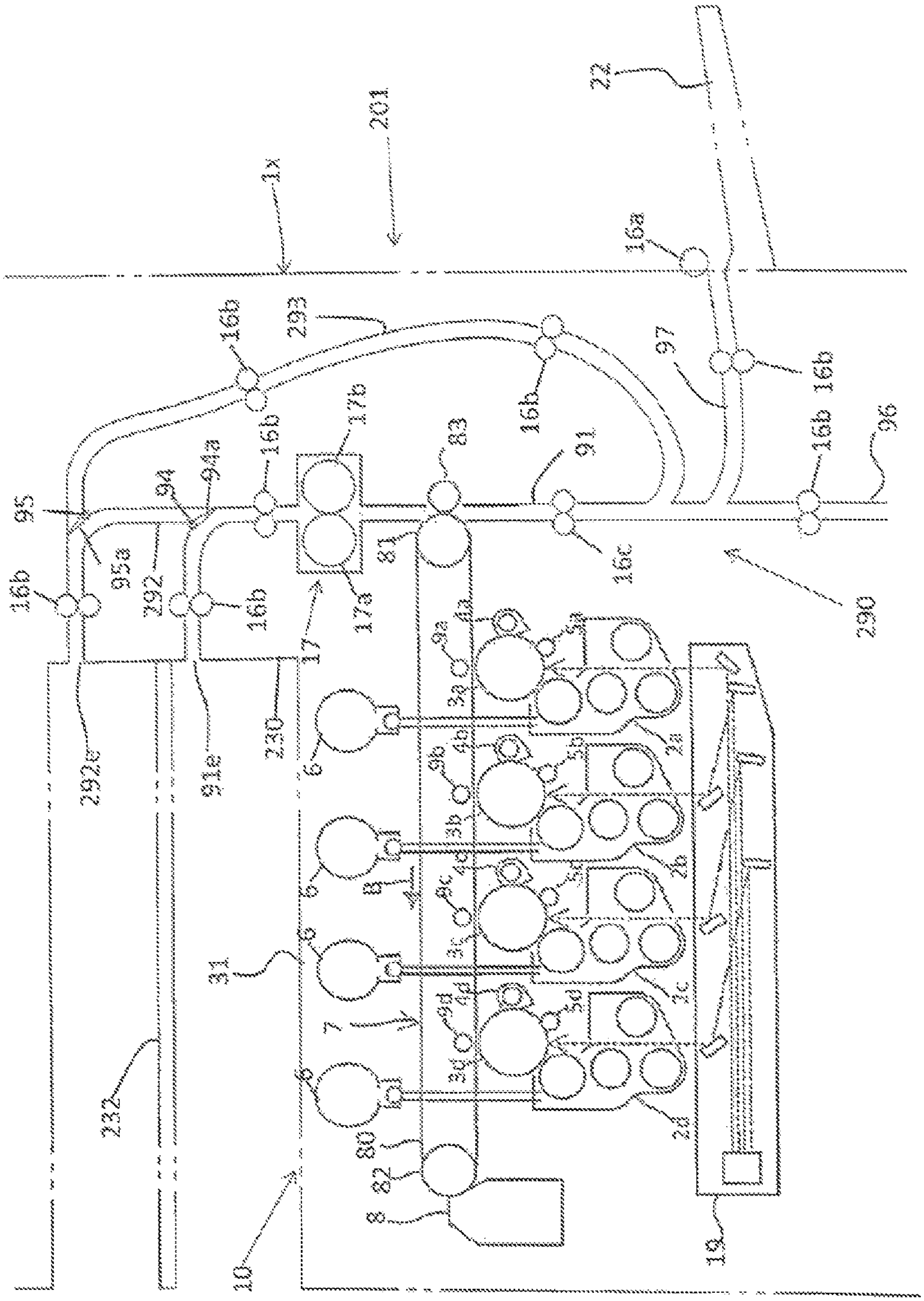
FIG. 13 is a schematic diagram illustrating the internal structure of an image forming device of a second embodiment.

FIG. 13 is a schematic diagram illustrating the internal structure of an image forming device of a second embodiment. Note that, in FIG. 13, the same components as those in FIG. 1 to 7 are denoted by the same reference signs.

As shown in FIG. 13, the image forming device 201 of the second embodiment is generally the same as that of the first embodiment, except in that the configurations of the sheet transport path 290 and the second paper discharge tray are different to those of the first embodiment. The aspects in which the second embodiment differs from the first embodiment will be mainly described below.

In the case of the second embodiment, the first paper discharge tray 31, which serves as the paper discharger, is provided on the upper surface of the printing unit 10. Further, the second paper discharge tray 232, which is the other discharger, is provided above the first paper discharge tray 31. Furthermore, both the first discharge port 91*e* and the second discharge port 292*e* are provided on the inside surface of the discharger 230, and the second discharge port 292*e* is provided in a higher position than the first discharge port 91*e*. Therefore, the second transport path 292 turns left from the portion that is connected with the first transport path 91, and is connected to the second discharge port 292*e*. The third transport path 293 turns left from the portion that is connected with the first transport path 91, and is connected to an intermediate portion of the second transport path 292. Like the first embodiment, the first switcher 94 is provided in a portion of the second transport path 292 that is connected with the first transport path 91, and the second switcher 95 is provided in a portion of the third transport path 293 that is connected with the second transport path 292.

FIG. 14 to 17 are first to fourth explanatory operation diagrams illustrating duplex printing by the image forming device of the second embodiment.

Next, the operation of the image forming device 201 according to the second embodiment when performing duplex printing of the long paper sheet S will be described. After the preparation for duplex printing is completed in the same manner as the first embodiment, a start operation of the duplex printing is performed using the operator 72 or a PC (see FIG. 1). Consequently, as shown in FIG. 14, the one end s1 side of the long paper sheet S on the manual feed tray 22 is sent from the non-standard size sheet transport path 97 to the first transport path 91 by the pickup roller 16*a* and the transport rollers 16*b*, and a toner image is formed on one side as a result of the long paper sheet S passing by the transferer (transfer roller 83) and the fuser 17.

Figure 14:
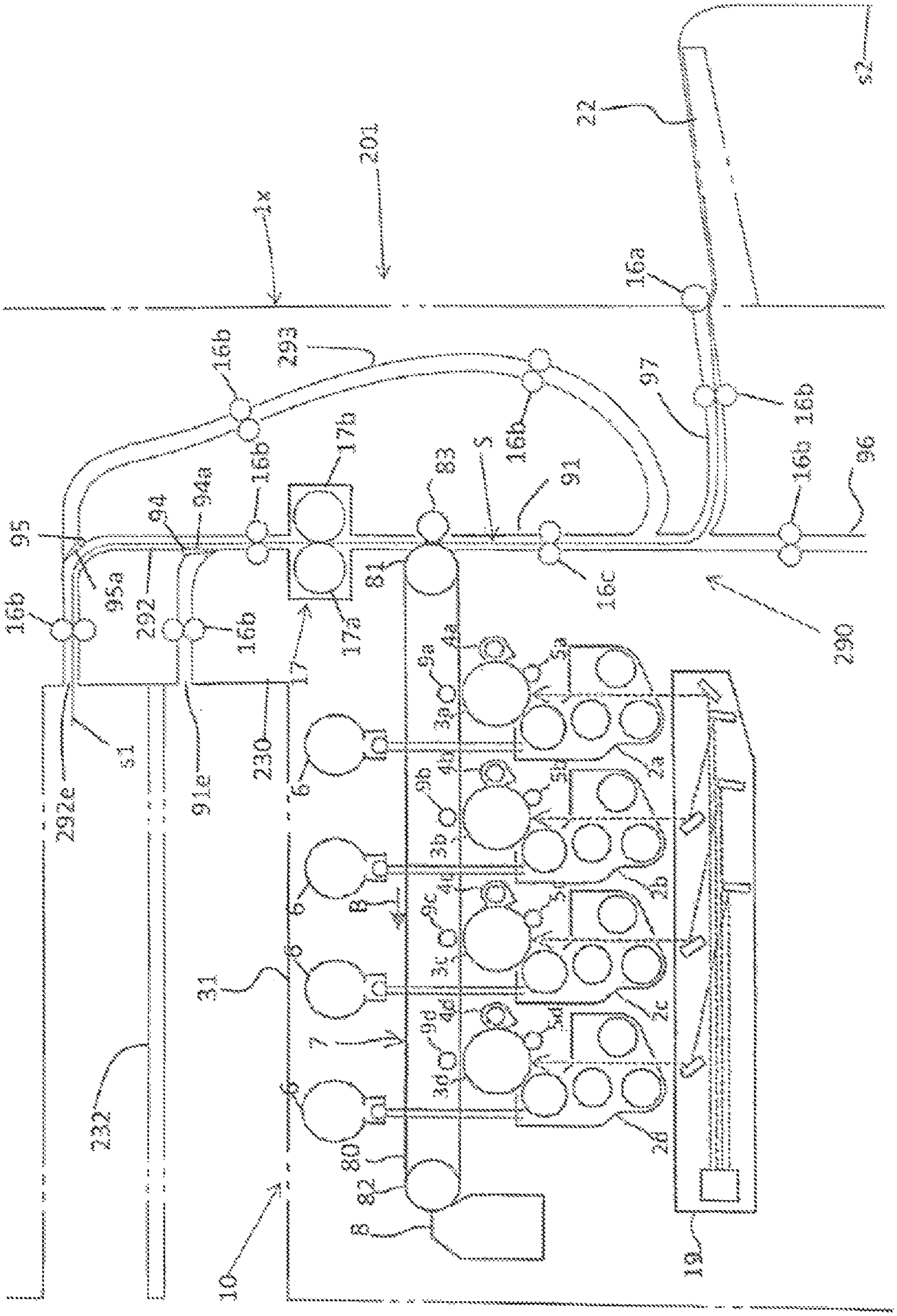
FIG. 14 is a first explanatory operation diagram illustrating duplex printing by the image forming device of the second embodiment.
Figure 15:
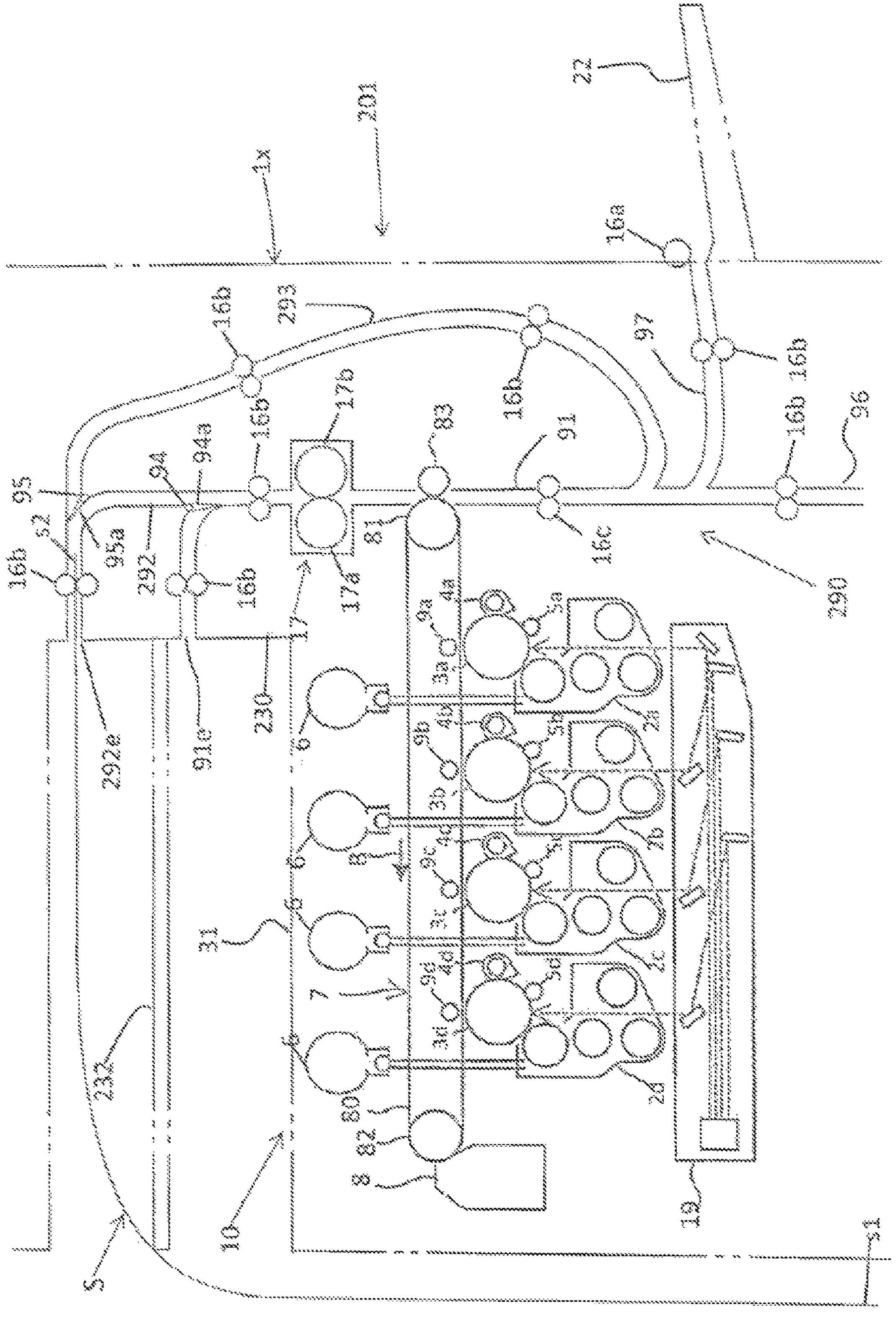
FIG. 15 is a second explanatory operation diagram illustrating duplex printing by the image forming device of the second embodiment.

Then, as shown in FIG. 14, the one end s1 side of the long paper sheet S proceeds along the second transport path 92 and reaches the second discharge port 292*e*. As shown in FIG. 15, the one end s1 side slides on the second paper discharge tray 232 and hangs downward along the left surface of the housing 1*x*. Then, the transport rollers (paper discharge rollers) 16*b* stop once the another end s2 of the long paper sheet S passes the second switcher 95 and arrives in front of the transport roller (paper discharge roller) 16*b* near the second discharge port 292*e*. Similarly in this case, the one end s1 and the another end s2 of the long paper sheet S are detected by a sensor provided at a predetermined location of the sheet transport path 290, and the controller stops the transport rollers (paper discharge rollers) 16*b* at the timing the another end s2 approaches the transport rollers (paper discharge rollers) 16*b*.

Figure 16:
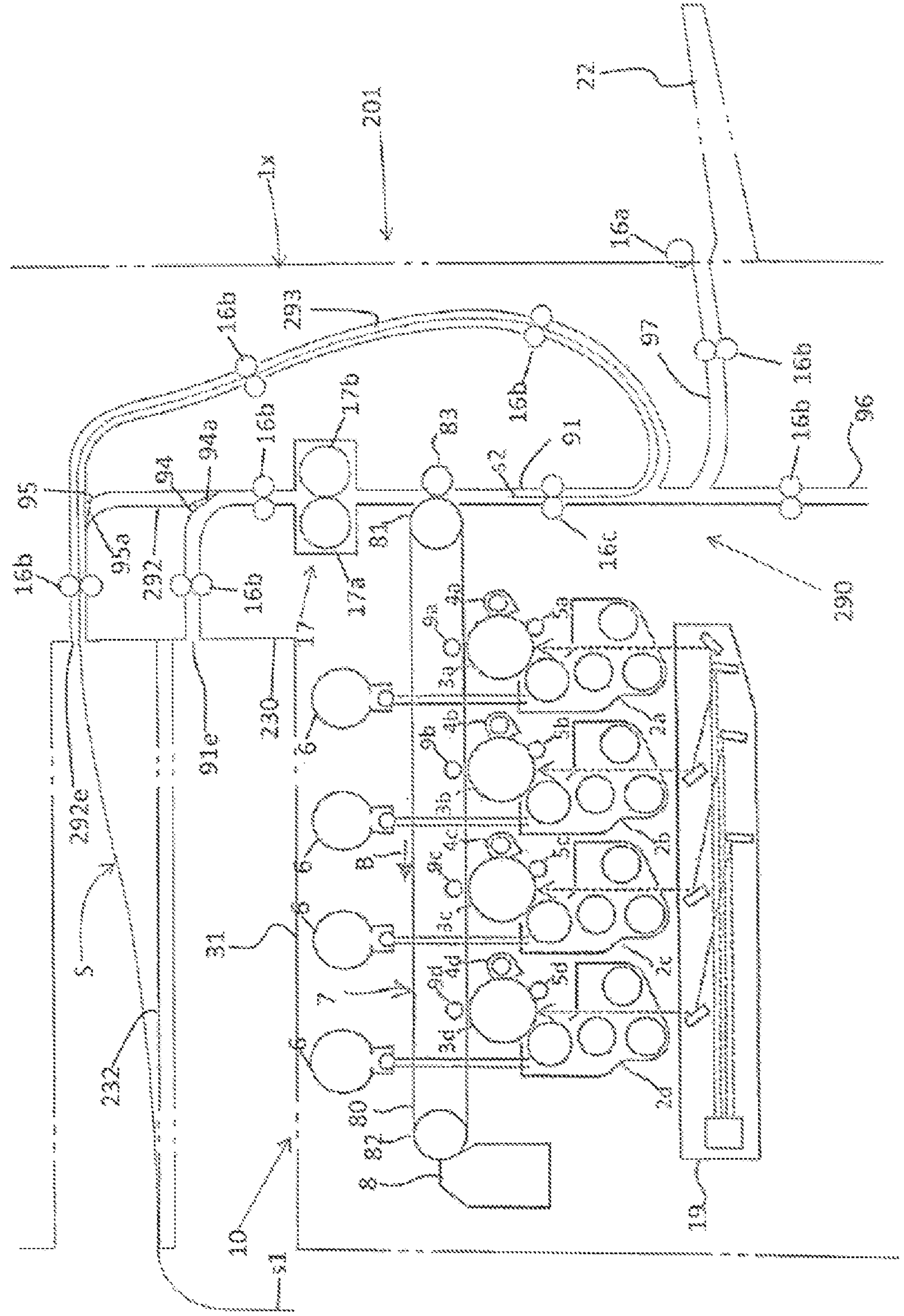
FIG. 16 is a third explanatory operation diagram illustrating duplex printing by the image forming device of the second embodiment.
Figure 17:
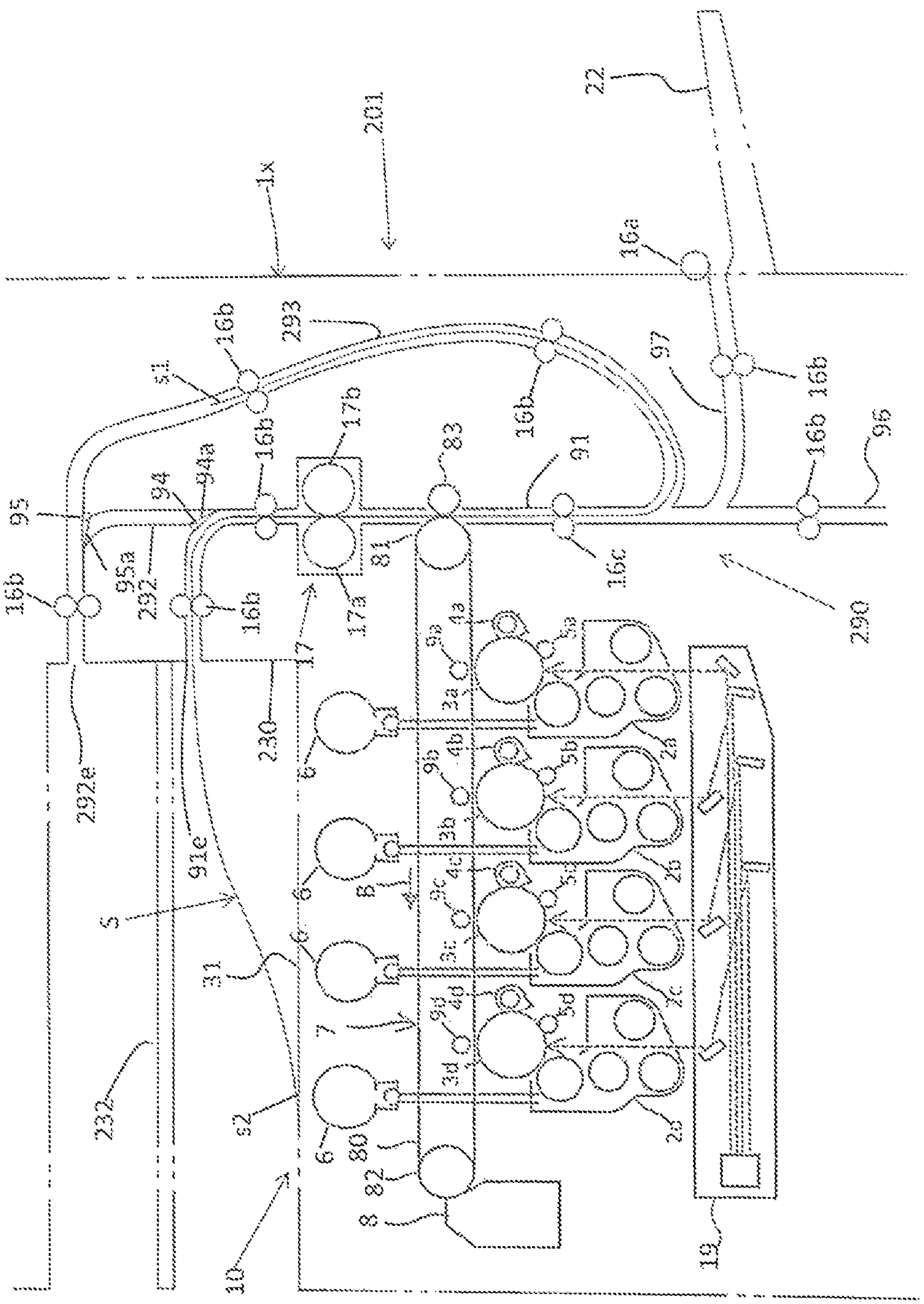
FIG. 17 is a fourth explanatory operation diagram illustrating duplex printing by the image forming device of the second embodiment.

Then, as shown in FIG. 16, the controller pivots the second switching plate 95*a* of the second switcher 95 such that the second discharge port 292*e* and the third transport path 293 communicate with each other, and also pivots the first switching plate 94*a* of the first switcher 94 such that the first discharge port 91*e* and the first transport path 91 communicate with each other. In addition, the transport rollers (paper discharge rollers) 16*b* are rotated in reverse to transport the another end s2 side of the long paper sheet S to the third transport path 293. Then, as shown in FIG. 17, the another end s2 side enters the first transport path 91, and a toner image is formed on the another side of the long paper sheet S as a result of the long paper sheet S passing by the transferer (transfer roller 83) and the fuser 17. Then, the long paper sheet S on which a toner image has been formed on both sides is ejected from the first discharge port 91*e* onto the first paper discharge tray 31. At this time, the another end s2 side of the long paper sheet S is made to slide on the first paper discharge tray 31 so that the another end s2 side does not stay on the first paper discharge tray 31, and the another end s2 side of the long paper sheet S is accommodated inside a cardboard box installed on the left side of the image forming device 1 as necessary.

As described above, like the first embodiment, the image forming device 201 of the second embodiment differs from the conventional technique in that the one end s1 side of the long paper sheet S with one printed side is temporarily discharged to the outside. Furthermore, the one end s1 side is temporarily discharged to the outside from the second discharge port 292*e*, which is separate from the first discharge port 91*e* through which the long paper sheet S is finally discharged. Also, after the one end s1 side is temporarily discharged to the outside, the one end 81 side of the long paper sheet S passes through a route that does not hinder the another end s2 side from proceeding while the another end s2 side of the long paper sheet S is being transported to the first discharge port 91*e*. Therefore, duplex printing can be performed without limitations in the sheet length of the long paper sheet S.

As shown in FIG. 15, in the case of the second embodiment, the length of the second paper discharge tray 232 in the paper sheet transport direction is greater than or equal to the length of the first paper discharge tray 31 in the paper sheet transport direction. Therefore, the one end s1 of the long paper sheet S that has been temporarily discharged from the second discharge port 292*e* can be prevented from hanging down from the second paper discharge tray 232 and lying on the first paper discharge tray 31. That is, if the horizontal direction projection dimension from the upper level discharge port of the one tray disposed on the upper level is greater than or equal to the horizontal direction projection dimension from the lower level discharge port of the another tray disposed on the lower level, the long paper sheet hanging down from the upper level tray will never lie on the lower level tray.

Third Embodiment

The image forming device of the present disclosure may be provided with the paper discharge trays in two vertical levels, in which the first discharge port and the second discharge port are both provided on the outer surface of the device. In this case, the first discharge port on the upstream side is configured as the upper level, and the second discharge port on the downstream side is configured as the lower level.

In this configuration, the projection dimension of the tray body of the first discharge port from the outer surface of the device is greater than or equal to the projection dimension of the tray body of the second discharge port from the outer surface of the device. Therefore, when the long paper sheet is discharged from the first discharge port after completion of the duplex printing, and is hanging down from the tray body of the first discharge port, it is possible to prevent the long paper sheet from coming into contact with the tray body of the second discharge port. That is, if the horizontal direction projection dimension from the upper level discharge port of the one tray disposed on the upper level is greater than or equal to the horizontal direction projection dimension from the lower level discharge port of the another tray disposed on the lower level, the long paper sheet hanging down from the upper level tray will never lie on the lower level tray.

Fourth Embodiment

The first to fifth modifications of the first embodiment (see FIG. 8 to 12) are limited to the second paper discharge tray 32 provided on the outside surface of the housing 1*x* of the first embodiment. However, the first to fifth modifications may also be applied to the first paper discharge tray 31 provided on the inner surface of the first embodiment, and may also similarly be applied to the first paper discharge tray and the second paper discharge tray of the second embodiment and the third embodiment.

As described above:

(i) An image forming device according to the present disclosure includes: an image former that forms a toner image on a paper sheet; a fuser that fuses a toner image formed on a paper sheet; a sheet transport path that transports a paper sheet to the image former and the fuser; a first discharge port and a second discharge port that are connected to the sheet transport path so as to enable a paper sheet on which a toner image has been fused to be discharged to the outside; and a controller, where the sheet transport path includes a first transport path that transports a paper sheet to the image former and the fuser, and transports a paper sheet on which a toner image has been fused to the first discharge port, a second transport path that connects a transport direction downstream side of the fuser in the first transport path to the second discharge port, a third transport path that connects a transport direction upstream side of the second discharge port in the second transport path to a transport direction upstream side of the image former in the first transport path, a first switcher provided in a portion of the second transport path that is connected with the first transport path, and a second switcher provided in a portion of the third transport path that is connected with the second transport path, and the controller, in the case of duplex printing, controls a switching operation of the first switcher and the second switcher such that a one end side of a paper sheet on which a toner image has been fused on one side is transported to the second discharge port, and controls a switching operation of the second switcher such that, when the one end side is being discharged from the second discharge port to the outside, reverses a paper sheet and causes another end side, being the opposite side to the one end, to be transported toward the image former via the third transport path and the first transport path.

According to this configuration, at the time of duplex printing of a paper sheet, upon discharging a transport direction one end side of the paper sheet on which a toner image has been formed on one side through the second transport path and to the outside from the second discharge port, and temporarily discharging a large portion of the paper sheet from the second discharge port to the outside, it is possible to form a toner image on another side on which a toner image has not been formed by sending the transport direction another end side of the paper sheet to the first transport path via the third transport path, and then sending the paper sheet to the image former and the fuser. A large portion of the paper sheet can be temporarily discharged to the outside during such a reversal of the paper sheet. Therefore, duplex printing is possible even in a case of a long paper sheet in which the paper sheet has a length that exceeds the total length of the transport path. This allows limitations in the sheet length to be eliminated.

Further, the preferable modes of the present disclosure will be described.

(ii) The controller may control a switching operation of the first switcher such that a paper sheet on which a toner image has been fused on one side and another side is discharged from the first discharge port.

According to this configuration, the another end of the paper sheet can be discharged from the first discharge port after duplex printing. Therefore, when the paper sheet is a long paper sheet, it is possible for the transport path to be controlled with certainty such that the another end after duplex printing can be prevented from intersecting a paper sheet being transported prior to duplex printing. Note that, if the another end after duplex printing has a paper sheet length that is not long enough to collide with the one end side, the another end of the paper sheet after duplex printing may be discharged from the second discharge port.

(iii) The image former, the fuser, and the sheet transport path may be provided inside a housing, the housing may be provided with a discharger provided on the image former, the first discharge port may be provided on an outside surface of the discharger, and the second discharge port may be provided at a lower position than the first discharge port on the outside surface of the discharger.

According to this configuration, it is possible to provide the first discharge port and the second discharge port on the same outside surface of the housing.

(iv) The image former, the fuser, and the sheet transport path may be provided inside a housing, the housing may be provided with a paper discharger provided on the image former, and a discharger provided on the image former so as to be adjacent to the paper discharger, the first discharge port may be provided on an inside surface of the discharger on the paper discharger side, and the second discharge port may be provided at a higher position than the first discharge port on the inside surface of the discharger. According to this configuration, the paper discharger is configured by two vertical levels, which makes it possible to receive a printed paper sheet from the first discharge port at the lower level paper discharger, and receive a printed paper sheet from the second discharge port at the upper level paper discharger. That is, an image forming device can be obtained in which a paper discharger having two vertical levels is disposed in a concentrated manner in an upper part of the image former.

(v) The image former, the fuser, and the sheet transport path may be provided inside a housing, the housing may be provided with a paper discharger provided on the image former, and a discharger provided on the image former so as to be adjacent to the paper discharger, the first discharge port may be provided on an inside surface of the discharger on the paper discharger side, and the second discharge port may be provided on an outside surface of the discharger on an opposite side to the paper discharger. According to this configuration, the second discharge port is provided on the outside surface of the discharger of the housing. Therefore, it is possible to obtain an image forming device having a paper discharger with a large stackable volume of printed paper sheets. Furthermore, the second discharge port can be used as an outlet port for printed paper sheets when not performing duplex printing, such as when receiving a fax.

(vi) A first discharge port tray may be provided that receives a paper sheet that has been discharged from the first discharge port, and a second discharge port tray may be provided that receives a paper sheet that has been discharged from the second discharge port are provided in two vertical levels, and among the first discharge port tray and the second discharge port tray, a horizontal direction projection dimension from an upper level discharge port of one tray disposed on an upper level may be greater than or equal to a horizontal direction projection dimension from a lower level discharge port of another tray disposed on a lower level.

According to this configuration, a long paper sheet hanging down from the upper level tray will not lie on the lower level tray.

(vii) A discharge port tray may be provided that receives a paper sheet that has been discharged from at least one of the first discharge port and the second discharge port, and a guide mechanism may be provided that guides a long paper sheet on the discharge port tray.

According to this configuration, after completion of single-sided printing, during duplex printing or after completion of duplex printing, a long paper sheet discharged from at least either the first discharge port and the second discharge port (including cases where the long paper sheet is temporarily and partially discharged) can be received at the paper discharge tray while the long paper sheet is guided by the guide mechanism so as to be discharged in a straight line. Furthermore, by providing the discharge port tray, for example, the one end side of a long paper sheet can be prevented from accumulating on the manual feed tray provided below the discharge port tray. In this case, it is preferable to place a receiving container on the floor to prevent the one end side of the long paper sheet hanging down from the discharge port tray from becoming dirty.

(viii) A discharge port tray may be provided that receives a paper sheet that has been discharged from at least one of the first discharge port and the second discharge port, and a curved surface or a roller may be provided on one end of the discharge port tray in a transport direction. According to this configuration, by providing the discharge port trays, for example, the one end side of a long paper sheet can be prevented from accumulating on the manual feed tray provided below the discharge port trays. Furthermore, the unprinted another side of the long paper sheet with one printed side can move smoothly along the curved surface or the roller. In this case, it is preferable to place a receiving container on the floor to prevent the one end side of the discharged long paper sheet from becoming dirty.

(ix) A discharge port tray may be provided that receives a paper sheet that has been discharged from at least one of the first discharge port and the second discharge port, and a storage cylinder may be provided on an end of the discharge port tray in a transport direction that is capable of temporarily accommodating a long paper sheet from the one end side. According to this configuration, a long paper sheet discharged from at least either the first discharge port and the second discharge port (including cases where the long paper sheet is temporarily and partially discharged) can be collected at a discharge port tray while being taken up and accommodated in the storage cylinder. This eliminates the need for a separate tray, box, or other receiving container placed on the floor to receive the one end side of the discharged long paper sheet.

(x) A display capable of displaying an operating state may be further provided, wherein the controller, in the case of duplex printing of a long paper sheet, may cause the display to display query content that asks a user whether or not a surrounding environment allows use of the tray. According to this configuration, for example, it is possible to prompt the user in advance to check that there is no object that may obstruct the one end side of the long paper sheet when it is discharged onto the tray and hangs down.

The preferred forms of the present disclosure also include those obtained by combining any of the forms described above.

Various modifications of the present disclosure may be implemented in addition to the embodiments described above. Such modifications should not be construed as falling outside the scope of the present disclosure. The present disclosure is embodied by the claims and their equivalents, and should embrace all modifications within the scope of the claims.

What is claimed is:

1. An image forming device comprising:

an image former that forms a toner image on a paper sheet;

a fuser that fuses the toner image formed on the paper sheet;

a sheet transport path that transports the paper sheet to the image former and the fuser;

a first discharge port tray and a second discharge port tray;

a first discharge port that is connected to the sheet transport path so as to enable the paper sheet on which the toner image has been fused to be discharged to the first discharge port tray;

a second discharge port that is connected to the sheet transport path so as to enable the paper sheet on which the toner image has been fused to be discharged to the second discharge port tray; and a controller, wherein:

the sheet transport path comprises:

a first transport path that transports the paper sheet to the image former and the fuser, and transports the paper sheet on which the toner image has been fused to the first discharge port, a second transport path that connects a transport direction downstream side of the fuser in the first transport path to the second discharge port, a third transport path that connects a transport direction upstream side of the second discharge port in the second transport path to a transport direction upstream side of the image former in the first transport path, a first switcher provided in a portion of the second transport path that is connected with the first transport path, and a second switcher provided in a portion of the third transport path that is connected with the second transport path, and in a case that a duplex printing on a long paper sheet serving as the paper sheet is selected, the controller controls a switching operation of the first switcher and a switching operation of the second switcher such that a one end side of the long paper sheet on which the toner image has been fused on one side is transported inevitably to the second discharge port, and when the one end side is being discharged from the second discharge port to the second discharge port tray, the controller controls the switching operation of the second switcher to reverse the long paper sheet and to cause another end side, being an opposite side of the one end, to be transported toward the image former via the third transport path and the first transport path, wherein the controller further controls the switching operation of the first switcher to discharge the other end side of the long paper sheet, which has been subjected to the duplex printing, to the first discharge port tray, inevitably without discharging the other end side of the long paper sheet to the second discharge port tray.

2. The image forming device according to claim 1, wherein the image former, the fuser, and the sheet transport path are provided inside a housing, the housing has a discharger provided on the image former, the first discharge port is provided on an outside surface of the discharger, and the second discharge port is provided at a lower position than the first discharge port on the outside surface of the discharger.

3. The image forming device according to claim 1, wherein the image former, the fuser, and the sheet transport path are provided inside a housing, the housing has a paper discharger provided on the image former, a discharger provided on the image former so as to be adjacent to the paper discharger, the first discharge port is provided on an inside surface of the discharger on a paper discharger side, and the second discharge port is provided at a higher position than the first discharge port on the inside surface of the discharger.

4. The image forming device according to claim 1, wherein the image former, the fuser, and the sheet transport path are provided inside a housing, the housing has a paper discharger provided on the image former, and a discharger provided on the image former so as to be adjacent to the paper discharger, the first discharge port is provided on an inside surface of the discharger on a paper discharger side, and the second discharge port is provided on an outside surface of the discharger on an opposite side of the paper discharger side.

5. The image forming device according to claim 1, wherein the first discharge port tray and the second discharge port tray are provided in two vertical levels, and a horizontal direction projection dimension from an upper level discharge port of one of the first discharge port tray and the second discharge port tray, which is disposed on an upper level, is greater than or equal to a horizontal direction projection dimension from a lower level discharge port of another one of the first discharge port tray and the second discharge port tray, which is disposed on a lower level.

6. The image forming device according to claim 1, further provided with a guide mechanism that guides the long paper sheet on at least one of the first discharge port tray and the second discharge port tray.

7. The image forming device according to claim 1, wherein a curved surface or a roller is provided on an end of at least one of the first discharge port tray and the second discharge port tray in a transport direction.

8. The image forming device according to claim 1, wherein a storage cylinder is provided on an end of at least one of the first discharge port tray and the second discharge port tray in a transport direction, the storage cylinder being capable of temporarily accommodating the long paper sheet from the one end side.

9. The image forming device according to claim 1, further comprising a display capable of displaying an operating state, wherein the controller, in the case that the duplex printing on the long paper sheet serving as the paper sheet is selected, causes the display to display query content that asks a user whether a surrounding environment allows a use of the second discharge port tray.

* * * * *